(12) United States Patent
Wiepen et al.

(10) Patent No.: US 11,098,505 B2
(45) Date of Patent: Aug. 24, 2021

(54) ELECTRICAL RELEASE FOR INTERIOR COMPARTMENT (GLOVE BOX)

(71) Applicant: Inteva Products, LLC, Troy, MI (US)

(72) Inventors: Stefan Wiepen, Schwerte (DE); Niklas Kock, Sprockhövel (DE); Andreas Rahn, Radevormwald (DE)

(73) Assignee: INTEVA PRODUCTS, LLC, Troy, MI (US)

( * ) Notice: Subject to any disclaimer, the term of this patent is extended or adjusted under 35 U.S.C. 154(b) by 121 days.

(21) Appl. No.: 16/661,941

(22) Filed: Oct. 23, 2019

(65) Prior Publication Data

US 2020/0131813 A1 Apr. 30, 2020

Related U.S. Application Data

(60) Provisional application No. 62/751,125, filed on Oct. 26, 2018, provisional application No. 62/846,341, filed on May 10, 2019.

(51) Int. Cl.
*B60J 7/00* (2006.01)
*E05B 83/30* (2014.01)
(Continued)

(52) U.S. Cl.
CPC .............. *E05B 83/30* (2013.01); *B60R 7/04* (2013.01); *E05B 81/16* (2013.01); *E05B 81/36* (2013.01); *E05Y 2900/538* (2013.01)

(58) Field of Classification Search
CPC .. F25D 23/028; F25D 2323/024; E05F 3/104; E05F 3/20; E05Y 2201/638; C08L 23/10;
(Continued)

(56) References Cited

U.S. PATENT DOCUMENTS 4,569,213 A * 2/1986 Scelba ................... E05B 37/02
70/312
5,775,761 A * 7/1998 Asami ..................... B60R 7/04
224/282
(Continued)

FOREIGN PATENT DOCUMENTS

CN 101722898 A 6/2010
CN 107117108 A 9/2017
(Continued)

OTHER PUBLICATIONS

Chinses First Office Action; International Application No. 201911024728.7; International Filing Date: Oct. 25, 2019; dated Nov. 10, 2020; 12 pages.

*Primary Examiner* — Kiran B Patel
(74) *Attorney, Agent, or Firm* — Cantor Colburn LLP

(57) ABSTRACT

A compartment assembly includes a housing, a door movable relative to the housing between an open position and a closed position, an arm extending from the door having a first engagement surface and a second engagement surface, and an actuation system. The actuation system includes a prime mover and a pin connected to the housing and operably coupled to the door. The pin is movable by the prime mover. A biasing mechanism is coupled to the pin to bias the pin into engagement with the arm. When the door is in the closed position, engagement between the first engagement surface and the pin restricts movement of the door. Engagement between the second engagement surface and the pin opposes the biasing force of the biasing mechanism to allow movement of the door.

20 Claims, 22 Drawing Sheets

(51) Int. Cl.
  *B60R 7/04* (2006.01)
  *E05B 81/16* (2014.01)
  *E05B 81/36* (2014.01)

(58) Field of Classification Search
  CPC . B60R 7/06; B25J 21/02; B60N 3/102; E05B 83/30
  See application file for complete search history.

(56) References Cited

U.S. PATENT DOCUMENTS

| | | | | |
|---|---|---|---|---|
| 5,971,463 | A * | 10/1999 | Nowak | B60R 7/06 296/37.8 |
| 6,003,925 | A * | 12/1999 | Litke | B60R 7/04 16/319 |
| 6,213,524 | B1 | 4/2001 | Bree et al. | |
| 6,223,468 | B1 * | 5/2001 | Kobayashi | E05B 81/20 292/201 |
| 6,382,687 | B1 * | 5/2002 | Gruhn | E05B 81/14 292/201 |
| 7,127,778 | B2 * | 10/2006 | Salice | E05F 5/006 16/354 |
| 8,562,058 | B1 * | 10/2013 | Kim | B60R 7/06 296/37.12 |
| 9,346,494 | B2 * | 5/2016 | Dieringer | E05C 17/14 |
| 9,914,398 | B1 * | 3/2018 | Sanders | B60R 7/06 |
| 10,697,211 | B2 * | 6/2020 | Cavallin | B65D 45/16 |
| 2002/0167179 | A1 * | 11/2002 | Takamura | E05B 81/20 292/201 |
| 2007/0013202 | A1 * | 1/2007 | Tompson | B60R 7/04 296/37.1 |
| 2007/0075552 | A1 * | 4/2007 | Hayakawa | E05B 81/16 292/216 |
| 2007/0189027 | A1 * | 8/2007 | Sakakibara | B60Q 3/76 362/490 |
| 2009/0284023 | A1 * | 11/2009 | Cho | E05B 83/30 292/34 |
| 2014/0131357 | A1 * | 5/2014 | Hirama | B60R 7/06 220/260 |
| 2015/0144631 | A1 * | 5/2015 | Nakashima | E05B 83/30 220/260 |
| 2017/0015251 | A1 * | 1/2017 | Arendsen | B62D 65/14 |
| 2017/0292297 | A1 * | 10/2017 | Bartels | E05B 77/04 |
| 2017/0313257 | A1 * | 11/2017 | Kang | B60R 7/04 |
| 2017/0368998 | A1 * | 12/2017 | Arendsen | B60R 7/04 |
| 2018/0370446 | A1 * | 12/2018 | Asselin | B60R 7/082 |
| 2019/0153766 | A1 * | 5/2019 | Knappe | B60R 7/06 |
| 2019/0153769 | A1 * | 5/2019 | Ottolini | E05F 15/70 |
| 2019/0283555 | A1 * | 9/2019 | Couto Maquieira | E05B 81/00 |
| 2020/0017031 | A1 * | 1/2020 | Bauernfeind | B60R 7/005 |
| 2020/0362601 | A1 * | 11/2020 | Im | E05B 81/34 |
| 2020/0370356 | A1 * | 11/2020 | Rapetti | B60R 7/06 |
| 2021/0078500 | A1 * | 3/2021 | Arendsen | B60R 7/046 |

FOREIGN PATENT DOCUMENTS

| | | |
|---|---|---|
| CN | 206664457 U | 11/2017 |
| CN | 206841321 U | 1/2018 |
| CN | 207406199 U | 5/2018 |
| DE | 19710531 A1 | 9/1998 |
| EP | 1350675 A2 | 10/2003 |

* cited by examiner

ELECTRICAL RELEASE FOR INTERIOR COMPARTMENT (GLOVE BOX)

CROSS-REFERENCE

This application claims the benefit of U.S. Provisional Application No. 62/751,125 filed Oct. 26, 2018 and U.S. Provisional Application No. 62/846,341 filed May 10, 2019, the disclosure of which is incorporated herein by reference in its entirety.

TECHNICAL FIELD

Embodiments of the present disclosure relate to door and movable panels, and more particularly to an actuation system of a glove box assembly for vehicles.

BACKGROUND

Typically, a mechanism for operating a vehicle glove box includes a mechanical device. Examples of the mechanical device can include either a simple single retracting pawl or a more modern dual side pawl. However, with improvements in vehicle technology, it is desirable to fully automate operation of a vehicle glove box, including opening the glove box.

SUMMARY OF THE INVENTION

According to an embodiment, a compartment assembly includes a housing, a door movable relative to the housing between an open position and a closed position, an arm extending from the door having a first engagement surface and a second engagement surface, and an actuation system. The actuation system includes a prime mover and a pin connected to the housing and operably coupled to the door. The pin is movable by the prime mover. A biasing mechanism is coupled to the pin to bias the pin into engagement with the arm. When the door is in the closed position, engagement between the first engagement surface and the pin restricts movement of the door. Engagement between the second engagement surface and the pin opposes the biasing force of the biasing mechanism to allow movement of the door.

In addition to one or more of the features described above, or as an alternative, in further embodiments at least one of said second engagement surface and an end of the pin has a sloped contour.

In addition to one or more of the features described above, or as an alternative, in further embodiments said second engagement surface is engaged with said pin during movement of the door from the open position to the closed position.

In addition to one or more of the features described above, or as an alternative, in further embodiments the prime mover is operable to move said pin linearly against the biasing force of the biasing mechanism.

In addition to one or more of the features described above, or as an alternative, in further embodiments the prime mover is operable to rotate said pin against the biasing force of the biasing mechanism.

In addition to one or more of the features described above, or as an alternative, in further embodiments comprising an opening lever operably coupled to the pin to transfer movement from the prime mover to the pin.

In addition to one or more of the features described above, or as an alternative, in further embodiments the prime mover is operable to move said opening lever linearly.

In addition to one or more of the features described above, or as an alternative, in further embodiments the prime mover is operable to rotate said opening lever.

In addition to one or more of the features described above, or as an alternative, in further embodiments the actuation system is operable to move the door from the closed position to the open position in response to an input signal.

In addition to one or more of the features described above, or as an alternative, in further embodiments comprising a switch located remotely from the compartment assembly, the switch being operable to generate the input signal.

According to an embodiment, a compartment assembly includes a housing, a door movable relative to the housing between an open position and a closed position, and an actuation system operably coupled to the door. The actuation system includes a prime mover and a locking lever connected to the housing and rotated about an axis by the prime mover. When the door is in the closed position, the locking lever is coupled to a portion of the door to restrict movement of the door.

In addition to one or more of the features described above, or as an alternative, in further embodiments the actuation system is operable to move the door from the closed position to the open position in response to an input signal.

In addition to one or more of the features described above, or as an alternative, in further embodiments comprising a switch located remotely from the compartment assembly, the switch being operable to generate the input signal.

In addition to one or more of the features described above, or as an alternative, in further embodiments the actuation system is operable to move the door from the closed position to the open position in response to a manual input.

In addition to one or more of the features described above, or as an alternative, in further embodiments the prime motor is not self-locking.

In addition to one or more of the features described above, or as an alternative, in further embodiments the door includes at least one arm, the at least one arm extending through an opening formed in the housing.

In addition to one or more of the features described above, or as an alternative, in further embodiments a distal end of the at least one arm includes an arm opening and a portion of the locking lever is receivable within the arm opening to restrict movement of the door.

In addition to one or more of the features described above, or as an alternative, in further embodiments the locking lever includes an engagement member, the engagement member being receivable within the arm opening.

In addition to one or more of the features described above, or as an alternative, in further embodiments comprising a biasing mechanism connected to the locking lever, wherein a biasing force of the biasing mechanism biases the locking lever into engagement with the at least one arm.

In addition to one or more of the features described above, or as an alternative, in further embodiments the at least one arm includes a sloped surface, and engagement between the sloped surface and the locking lever as the door moves between from the open position to the closed position rotates the locking lever against the biasing force of the biasing mechanism.

In addition to one or more of the features described above, or as an alternative, in further embodiments the actuation system further comprises an opening lever rotatably mounted to the housing, wherein the opening lever is operable to rotate the locking lever in response to operation of the prime mover.

In addition to one or more of the features described above, or as an alternative, in further embodiments the opening lever includes an opening arm and a gear segment, the opening arm being configured to cooperate with the locking lever.

In addition to one or more of the features described above, or as an alternative, in further embodiments comprising a biasing mechanism connected to the locking lever, wherein the biasing mechanism biases the opening lever out of engagement with the locking lever.

In addition to one or more of the features described above, or as an alternative, in further embodiments the at least one arm is contoured such that the door rotates relative to the housing as it moves between the first position and the second position.

In addition to one or more of the features described above, or as an alternative, in further embodiments the housing includes at least one protrusion, and the at least one arm engages the protrusion to stop movement of the door when in the open position.

In addition to one or more of the features described above, or as an alternative, in further embodiments a contour of the at least one arm defines a recess, and the protrusion is nested within the recess when the door is in the open position.

In addition to one or more of the features described above, or as an alternative, in further embodiments the compartment assembly is a glove box assembly in a vehicle.

According to yet another embodiment, a method of opening a compartment door includes generating a signal to transform the compartment door of a compartment assembly between an open position and a closed position, operating a prime mover in response to the signal, and moving a pin out of engagement with the compartment door via operation of the prime mover, wherein moving the locking lever out of engagement with the compartment door includes opposing a biasing force of a biasing mechanism coupled to the pin.

In addition to one or more of the features described above, or as an alternative, in further embodiments operating the prime mover and moving the pin occur automatically in response to signal.

In addition to one or more of the features described above, or as an alternative, in further embodiments moving the pin out of engagement with the compartment door further comprises rotating an opening lever operably coupled to the pin, wherein the pin and the opening lever are rotatable about a single axis.

In addition to one or more of the features described above, or as an alternative, in further embodiments moving the pin out of engagement with the compartment door further comprises rotating an opening lever operably coupled to the pin.

The above-described and other features and advantages of the present invention will be appreciated and understood by those skilled in the art from the following detailed description, drawings, and appended claims.

BRIEF DESCRIPTION OF THE DRAWINGS

Embodiments of the present invention will now be described, by way of example only, with reference to the accompanying drawings in which.

DETAILED DESCRIPTION

Figure 1:
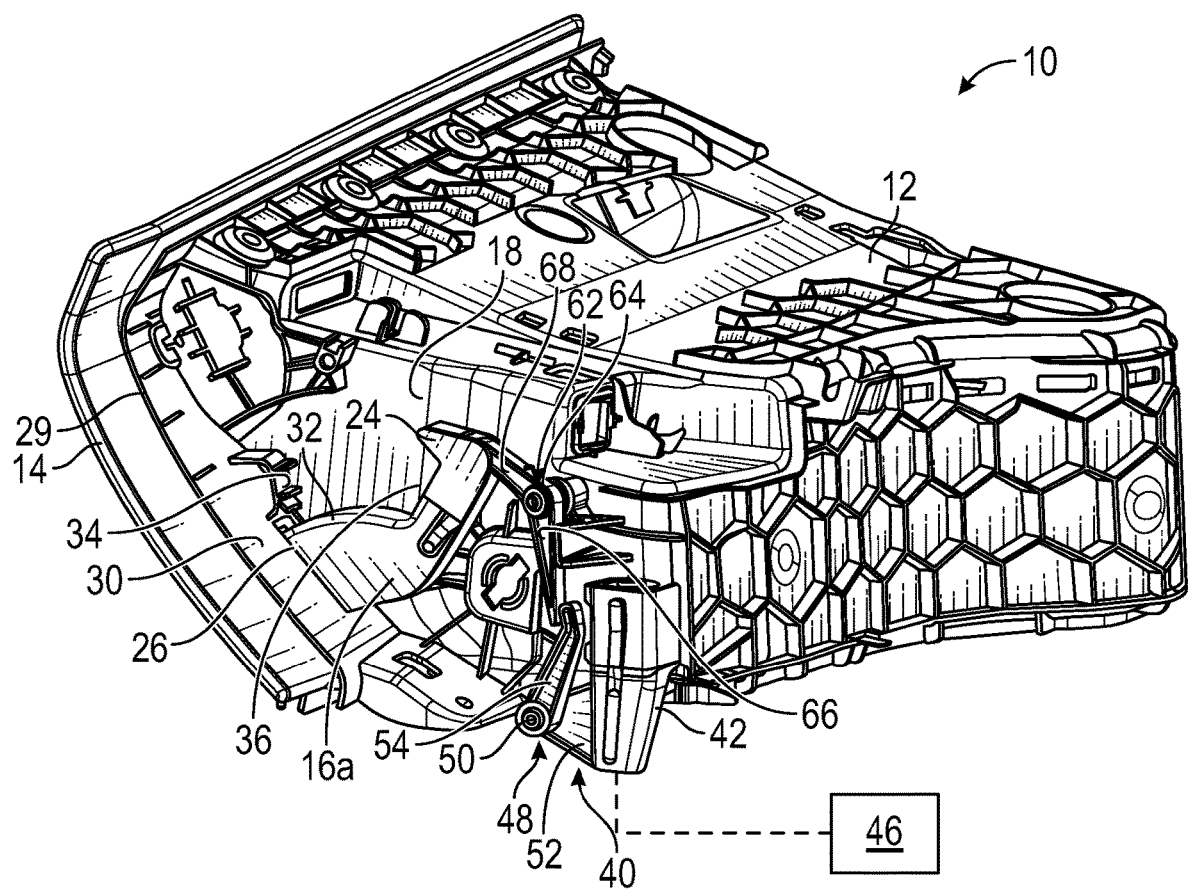
FIG. 1 is a side perspective view of a glove box assembly in a closed position according to an embodiment.

Referring now to the FIGS., an example of a compartment, such as a glove box assembly 10, is illustrated. The glove box assembly 10 includes a glove box housing 12 having a generally hollow interior or compartment 13 (see FIG. 3). A glove box door or lid 14 is movable relative to the glove box housing 12 movable between a first closed position (FIG. 1) and a second, open position (FIG. 3) to selectively provide a user with access to the hollow interior of the housing 12. As shown, the glove box door 14 is coupled to the housing 12. However, embodiments where the glove box door 14 is separate from the housing 12 are also contemplated herein.

Figure 2:
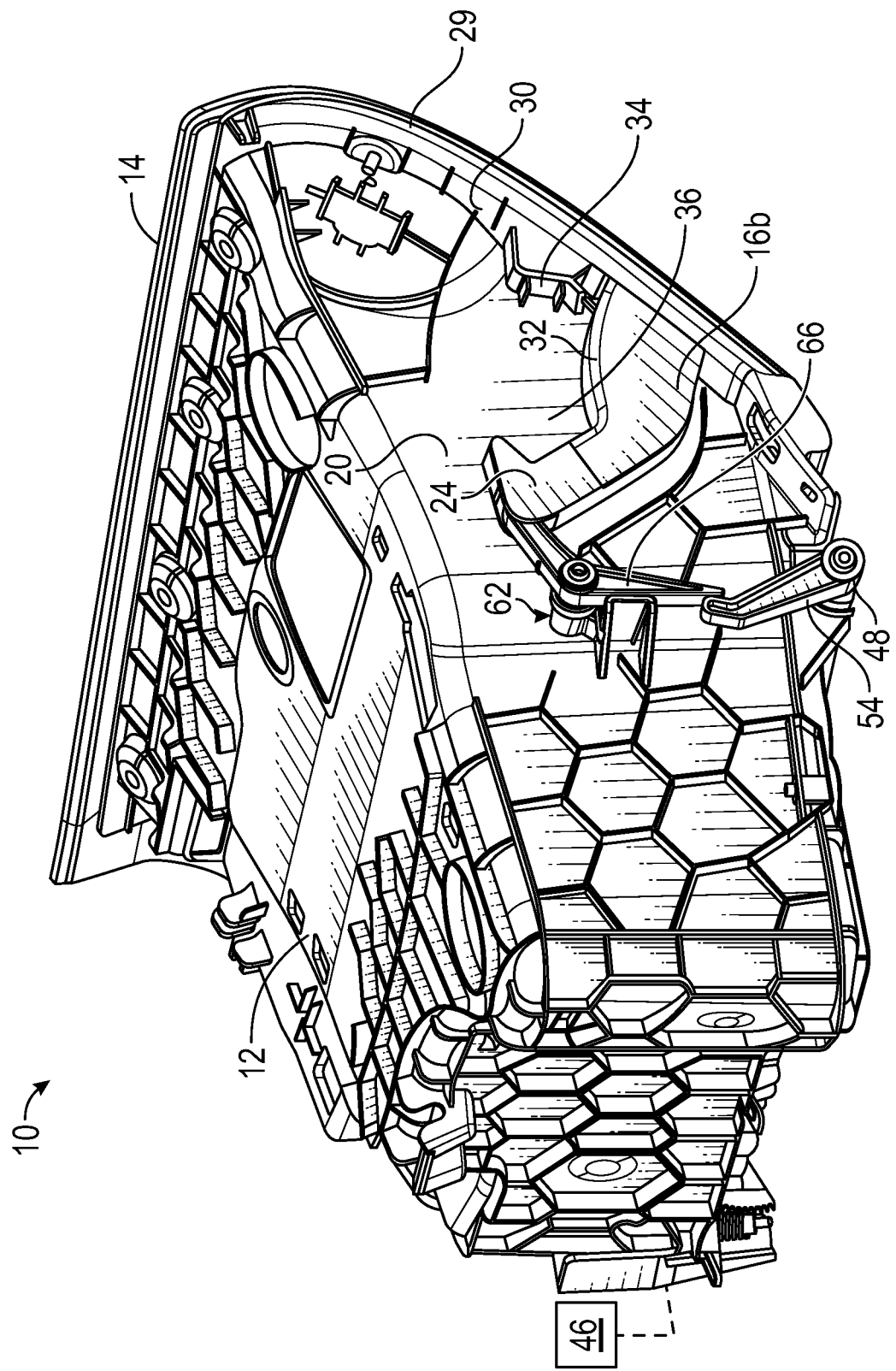
FIG. 2 is a side perspective view of a glove box assembly in a closed position according to an embodiment.

In the illustrated, non-limiting embodiment, one or more arms 16 extend from the glove box door 14 to couple the glove box door 14 to the housing 12. As shown, the glove box assembly 10 includes a first arm 16a arranged adjacent a first side 18 of the housing 12 and a substantially identical second arm 16b (FIG. 2) located adjacent a second, opposite side 20 of the housing 12. However, embodiments having only a single arm 16, or alternatively, more than two arms 16 are also contemplated herein.

Figure 3:
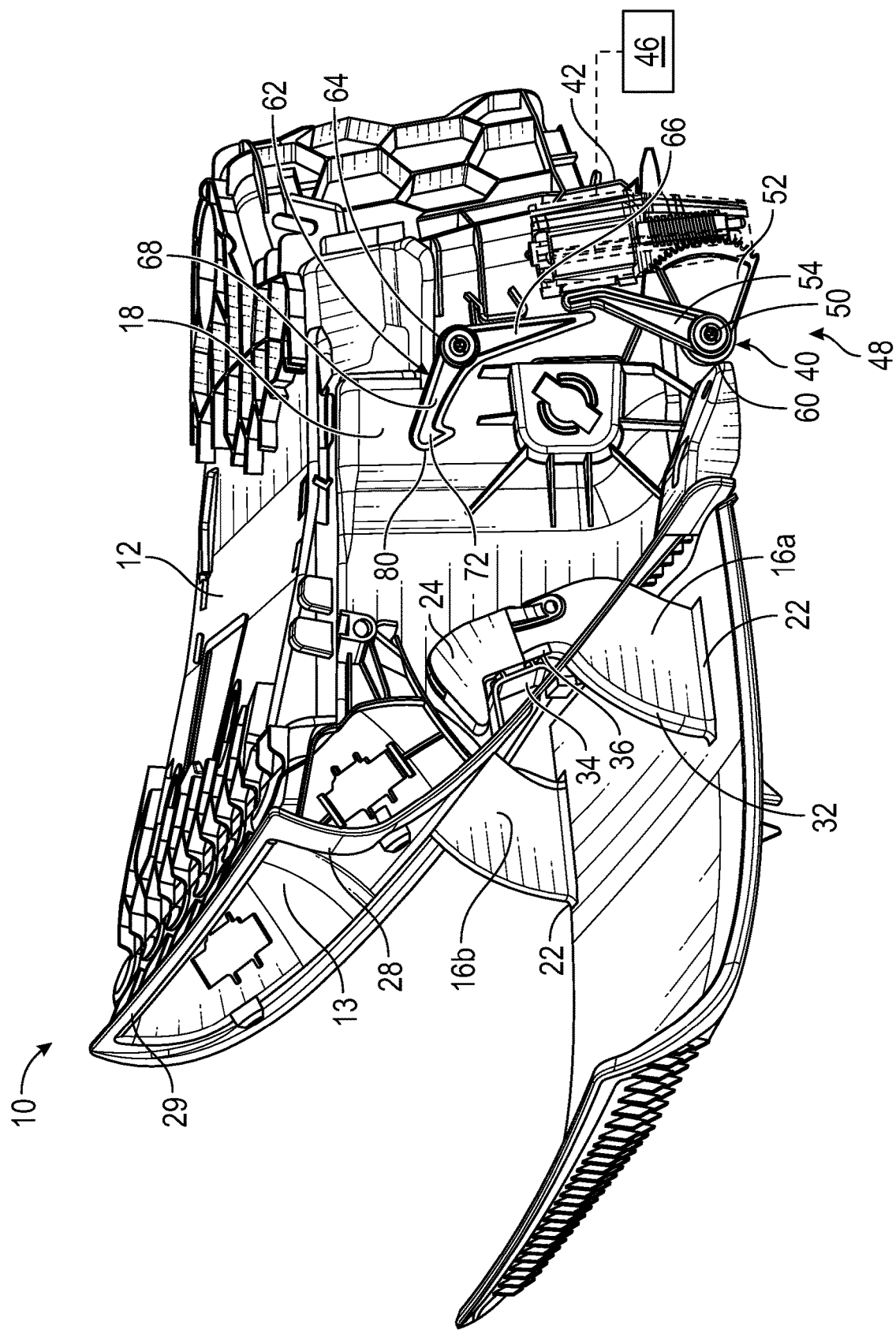
FIG. 3 is a side perspective view of a glove box assembly in an open position according to an embodiment.

As best shown in FIG. 3, a first end 22 of each arm 16a, 16b may be affixed to or integrally formed with a portion of the glove box door 14. A second end 24 of each arm 16a, 16b extends through an adjacent opening 26 formed in the housing 12. Each glove box arm 16a, 16b is configured to move through the opening 26 as the glove box door 14 transitions between an open position and a closed position. For example, when the glove box door 14 is in the closed position, as shown in FIG. 1, the first end 22 of the arms 16a, 16b is positioned directly adjacent a first side 28 (see FIG. 3) of a front panel 29 of the housing 12, such that the majority of the arms 16a, 16b extends through the opening 26 and is located adjacent the back surface 30 of the front panel 29 of the housing 12. When the glove box door 14 is in the open position, as shown in FIG. 3, the second ends 24 of the arms 16a, 16b may directly abut the back surface 30 of the front panel 29.

As shown, at least a first portion 32 of the arms 16a, 16b, extending from the first end 22 thereof, may be contoured to define a path of motion of the glove box door 14 relative to the housing 12 as the arms 16a, 16b translate through the openings 26. In the illustrated, non-limiting embodiment, the first portion 32 is curved causing the glove box door 14 to rotate relative to the housing 12 as the glove box door 14 opens.

The back surface 30 of the front panel 29 of the housing 12 may include a protrusion 34, such as positioned adjacent the opening 26 for example. In such embodiments, a contour of the arms 16a, 16b may define a recess 36 generally complementary to the protrusion 34. Accordingly, when the glove box door 14 is in the open position, the protrusion 34 is nests within the recess 36. This engagement between the protrusion 34 and a corresponding arm 16a, 16b restricts further movement of the glove box door 14, thereby defining a stop associated with the open position.

The glove box assembly 10 includes a glove box actuation system 40 selectively operable to move the glove box door 14. In an embodiment, the actuation system 40 is operable to automatically open the glove box door 14. The actuation system 40 generally includes a prime mover 42, such as a motor having a motor shaft 44 rotatable about an axis M for example. In an embodiment, the prime mover 42 is operable in response to receipt of a signal, operation of a switch, or another equivalent means, illustrated schematically at 46.

Referring now to FIGS. 4-9, an example of a glove box actuation system 40 is shown in more detail. In the illustrated non-limiting embodiment of FIGS., in addition to the prime mover 42 and motor shaft 44, the actuation system 40 includes an opening lever 48 movably mounted to the side 18 of the housing 12, such as via a pin 50 for example. In the illustrated, non-limiting embodiment, the opening lever 48 is positioned directly adjacent the prime mover 42 and includes a gear section 52 and an opening arm 54. The gear section 52 and the opening arm 54 may be integrally formed, or alternatively, may be separate components connected together such that the gear section 52 and the opening arm 54 rotate about an axis X defined by the pin 50 in unison. The gear section 52 of the opening lever 48 includes a plurality of gear teeth 56 (best shown in FIG. 5) and may be driven by a worm 58 mounted to the motor shaft 44. A biasing mechanism 60, such as a torsion spring for example, may be mounted about the pin 50 and coupled to a portion of the opening lever 48, such as gear section 52 for example, and/or the housing 12. The biasing mechanism 60 is configured to bias the opening lever 48 in a first direction, indicated by arrow A, away from the glove box door 14.

Figure 10:
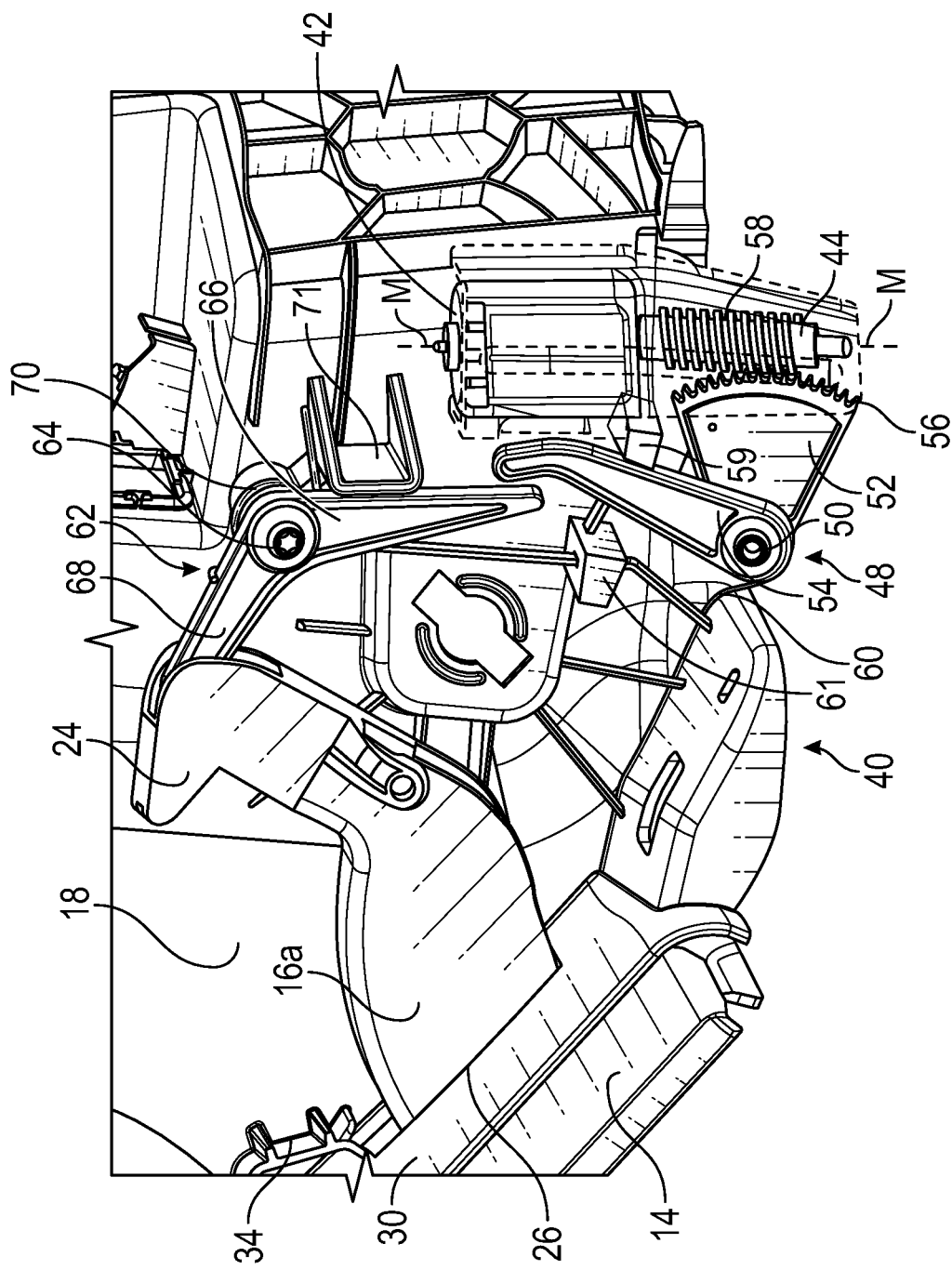
FIG. 10 is a side view of an actuation system of a glove box assembly in a closed position according to an embodiment.

As best shown in FIG. 10, in an embodiment, one or more end stops for limiting rotation of the opening lever 48 are mounted to the side 18 of the housing 12. As shown, a first end stop 59 is arranged adjacent a first side of the opening lever to limit rotation of the opening lever 48 driven by the biasing mechanism 60. A second end stop 61 is arranged adjacent a second side of the opening lever 48 to limit rotation of the opening lever 48 driven by the prime mover 42. Although both the first and second end stops 59, 61 are shown as being associated with the opening arm 54, it should be understood that the end stops 59, 61, may be associated with any portion of the opening lever 48. Further, it should be understood that embodiments having only the first end stop 59 or the second end stop 61, or alternatively, no end stops are also contemplated herein.

In the illustrated, non-limiting embodiment, the glove box actuation system 40 additionally includes a locking lever 62 movably mounted to the side 18 of the housing 12 via a pin 64, adjacent the opening lever 48. For example, the locking lever 62 may be rotatably mounted to the pin 64. As shown the locking lever 62 may include a first arm 66 and a second arm 68 arranged at an angle relative to one another. Although the first arm 66 and the second arm 68 are shown as being oriented at a non-zero angle, it should be understood that any angle, including a zero or 180 degree angle is also within the scope of the disclosure. Additionally, it should be understood that a locking lever 62 having another configuration is also contemplated herein.

In the illustrated, non-limiting embodiment, the first arm 66 is configured to cooperate with the opening arm 54 of the opening lever 48 and the second arm 68 is configured to cooperate with an adjacent arm 16 of the glove box door 14. Another biasing mechanism 70, such as a torsion spring for example, may be mounted about the pin 64 and is configured to bias the locking lever 62 in a second direction, indicated by arrow B, toward the arm 16 of the glove box door 14. In an embodiment, an end stop 71 (see FIG. 10) is arranged adjacent a first side of the locking lever 62 to limit rotation of the locking lever 62 driven by the biasing mechanism 70. Although the end stop 71 is shown as being configured to cooperate with the first arm 66, in other embodiments, the end stop 71 may be positioned so as to cooperate with the second arm 68.

As best shown in FIG. 3, an engagement member 72 may be formed at the distal end of the second arm 68 of the locking lever 62. The engagement member 72 is configured to cooperate with a portion of the adjacent glove box arm 16 to retain the glove box door 14 in the closed position relative to the housing 12. In an embodiment, best shown in FIG. 8, the second end 24 of the glove box arm 16a includes a cavity 74 within which the engagement member 72 of the locking lever 62 is receivable. When the engagement member 72 is positioned within the cavity 74, contact between the engagement member 72 and an adjacent first engagement surface 75 of the glove box arm 16a opposes the gravitational force acting on the glove box door 14. Accordingly, the engagement between the engagement member 72 and a corresponding arm 16a prevents the glove box door 14 from opening.

To open the glove box door 14, a signal is provided to the prime mover 42 from a switch 46 or other equivalent means. In an embodiment, the switch 46 may be located remotely from the glove box assembly 10. For example, in embodiments where the glove box assembly 110 is a compartment installed within a vehicle, the switch 46 may be located on a dashboard or console of the vehicle. In response to the signal, the prime mover 42 rotates the motor shaft 44 and the worm 58 coupled thereto in a first direction. As the motor shaft 44 rotates, the gear section 52 of the opening lever 48 is driven in a direction opposing the biasing force of the biasing mechanism 60. As the opening lever 48 moves, i.e. rotates about the axis X of the pin 50, the opening arm 54 contacts and transmits a force to the first arm 66 of the locking lever 62. This force causes the locking lever 62 to move, for example rotate, about axis Y, and opposes the biasing force of the biasing mechanism 70. Through this movement, the engagement member 72 is pivoted out of contact with the arm 16a.

Figure 11:
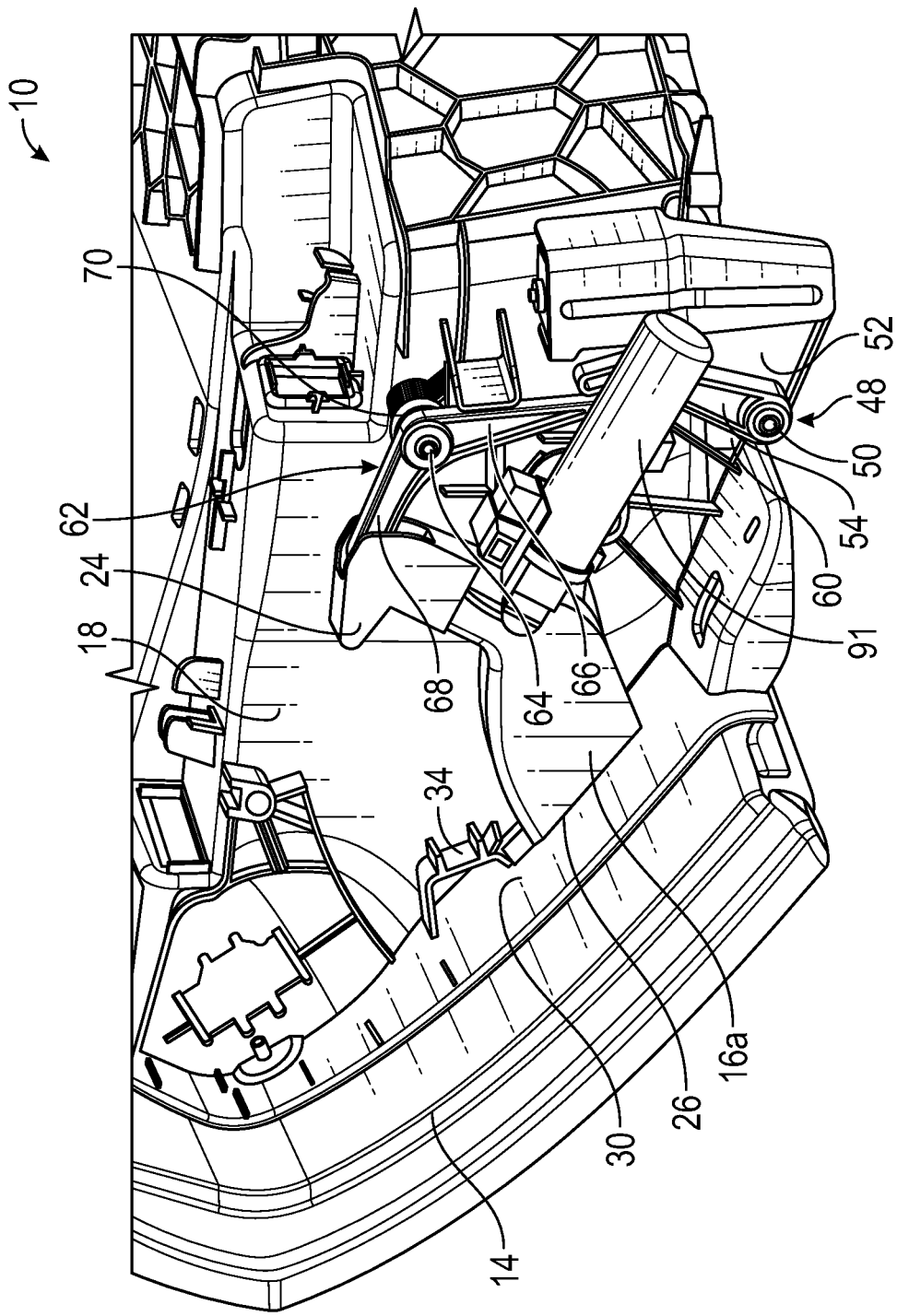
FIG. 11 is another side view of an actuation system of a glove box assembly in a closed position according to an embodiment.

Once separated, the arm 16a is able to move relative to the housing 12, for example along a path defined by the at least the first portion 32 of the arm 16a, thereby allowing the glove box door 14 to transform to the open position as a result of the weight of the door. The arm 16a will move relative to the housing 12 until the protrusion 34 is seated within the recess 36 of the arm 16. In an embodiment, best shown in FIG. 11, the glove box assembly 10 may additionally include at least one damping mechanism 91 coupled to a portion of the glove box door 14, such as to the arm 16a for example. The damping mechanism 91 is operable to control the movement, for example the speed, of the glove box door 14 as it transitions from the closed position to the open position.

In the event of a failure of the prime mover 42, such as due to damage for example, a user may also be able to manually open the glove box door 14. In an embodiment, the opening lever 48 of the actuation system 40, is mounted to the housing 12 such that a portion of the opening lever 48 is exposed adjacent an underside of the housing 12, such as when the glove box assembly 10 is mounted within a vehicle for example. Because the prime mover 42 associated with the glovebox actuation system 40 is not self-locking, an operator is able to provide a manual input to move the opening lever 48 relative the pin 50, in a direction opposing the biasing force of the biasing mechanism 60, to release the locking lever 62 from the arm 16a, thereby opening the glove box door 14.

To close the glove box door 14 and seal the compartment 13 of the housing 12, the glove box door 14 is moved manually, via application of a force by a user. As the glove box door 14 approaches the front panel 29 of the housing 12, a portion of the arm 16a, contacts a first surface 80 of the engagement member 72 of the locking lever 62. In the illustrated, non-limiting embodiment, the portion of the arm 16a that contacts the engagement member 72 includes a sloped or ramp-like second engagement surface 82 extending to the cavity 74 formed in the second end 24. With further movement of the arm 16a as the glove box door 14 closes, the contour of the second engagement surface 82 in contact with the first surface 80 of the engagement member 72 causes the locking lever 62 to move relative to the pin in a direction opposite the biasing force of the biasing mechanism 70. When the engagement member 72 reaches the cavity 74 positioned at the end of the second engagement surface 82, the force applied to the locking lever 62 by the arm 16a is removed. As a result, the biasing force of the biasing mechanism 70 causes the locking lever 62 to pivot about axis Y and the engagement member 72 to be received within the cavity 74. Within the cavity 74, the contact between the engagement member 72 and the first engagement surface 75 of the glove box arm 16a retains the glove box door 14 in the closed position.

With reference now to FIGS. 12-18, another embodiment of a compartment of a vehicle, such as a glove box assembly 110 for example, is illustrated. As previously described, the glove box assembly 110 includes a glove box housing 112 having a glove box door or lid 114 movable relative to the glove box housing 112 between a first closed position (FIG. 12) and a second, open position (FIG. 13) to selectively provide a user with access to the hollow interior of the housing 112.

One or more arms 116 extend from the glove box door 114 to couple the glove box door 114 to the housing 112. In the illustrated, non-limiting embodiment, the glove box assembly 110 includes a first arm 116a and a second arm 116b arranged adjacent a first side 118 and a second, opposite side 120 of the housing 112, respectively. However, embodiments having only a single arm 116, or alternatively, more than two arms 116 are also contemplated herein.

Figure 12:
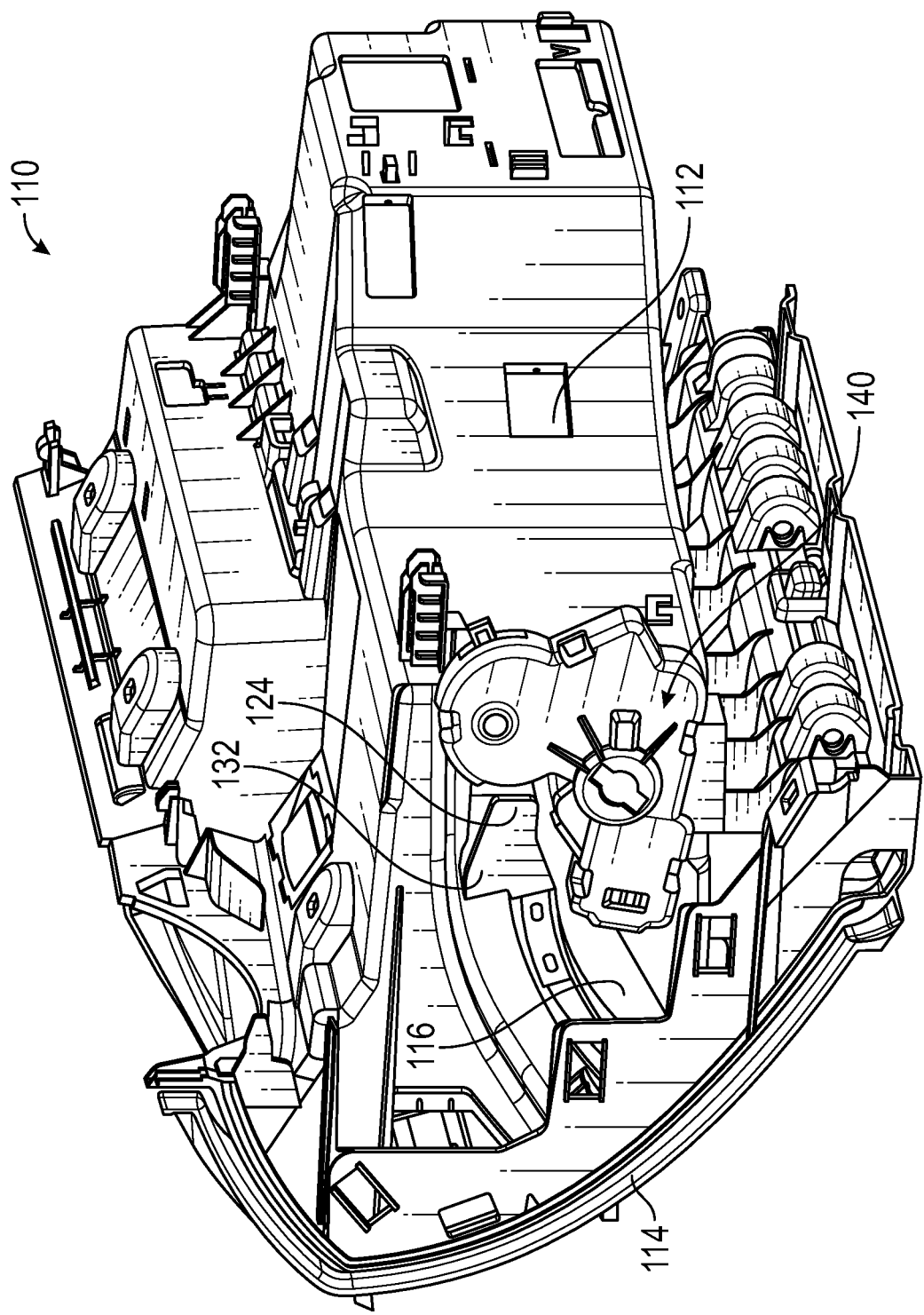
FIG. 12 is a side perspective view of another glove box assembly in a closed position according to an embodiment.
Figure 13:
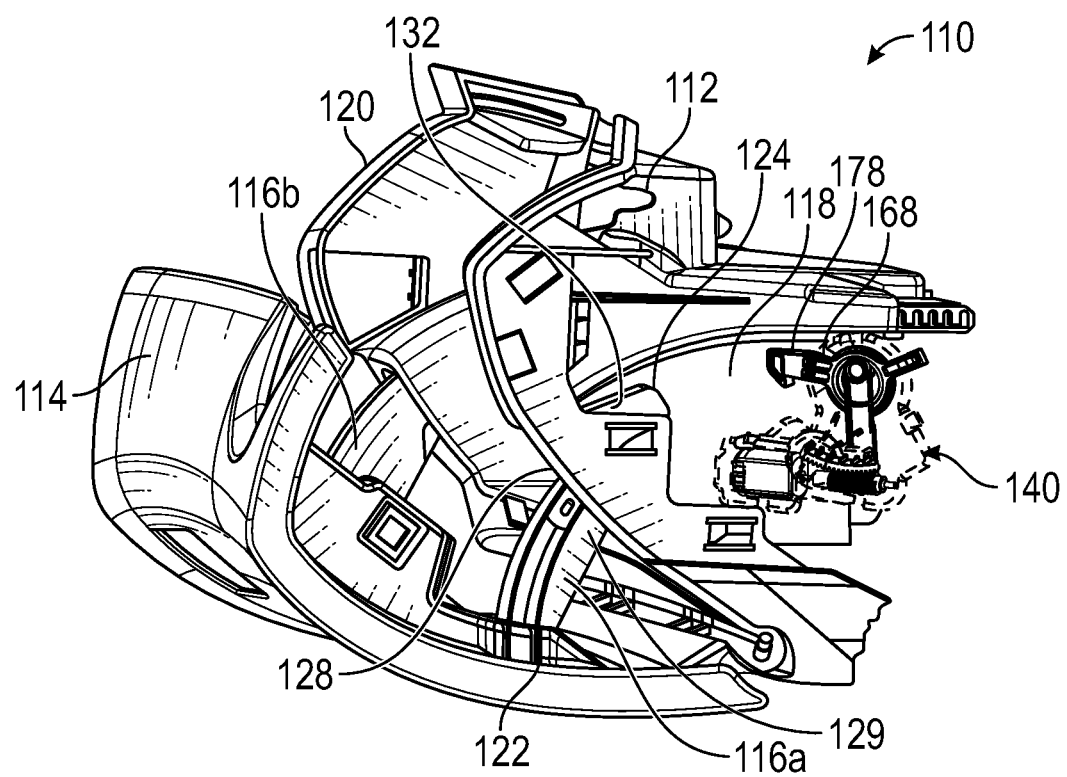
FIG. 13 is a side perspective view of a glove box assembly in an open position according to an embodiment.

A first end 122 of each arm 116a, 116b may be affixed to or integrally formed with a portion of the glove box door 114. In the illustrated, non-limiting embodiment, a second end 124 of each arm 116a, 116b extends through an opening (not shown) formed in the housing 112. As previously described, each arm 116a, 116b is configured to move, for example translate, through the opening as the glove box door 114 transitions between an open position and a closed position. When the glove box door 114 is in the closed position, as shown in FIG. 12, the first end 122 of each of the arms 116a, 116b is positioned directly adjacent a first side 128 of a front panel 129 of the housing 112, such that the majority of the arms 116a, 116b extends through the opening beyond the front panel 129 of the housing 112. When the glove box door 114 is open, as shown in FIG. 13, the second end 124 of each arm 116a, 116b may directly abut a back surface of the front panel 129.

The arms 116a, 116b may be contoured to define a path of motion of the glove box door 114 relative to the housing 112 as the arms 116a, 116b translate through the openings. In the illustrated, non-limiting embodiment, the arms 116a, 116b have a generally actuate contour causing the glove box door 114 to gradually pivot relative to the housing 112 as the glove box door 114 opens. However, arms 116 having any suitable contour, such as a linear contour for example, are within the scope of the disclosure.

In an embodiment, the second end 124 of each arm 116a, 116b includes an oversized connector 132. One or more dimensions of the connector 132 are greater than a corresponding dimension of the opening. As a result, as the glove box door 114 transitions from a closed position to an open position, the connector 132 will contact the back surface (not shown) of the front panel 129 adjacent the opening to restrict further movement of the glove box door 114 relative to the housing 112. Accordingly, this engagement between the connector 132 and the front panel 129 defines a stop position for rotation of the glove box door 114 in the open position.

Another example of a glove box actuation system 140 is illustrated in the FIGS. Although the glove box actuation system 140 is illustrated and described herein with respect to glove box assembly 110, it should be understood that the glove box actuation system 140 may be adapted for use with the glove box door 14 and housing 12 previously described.

Figure 14:
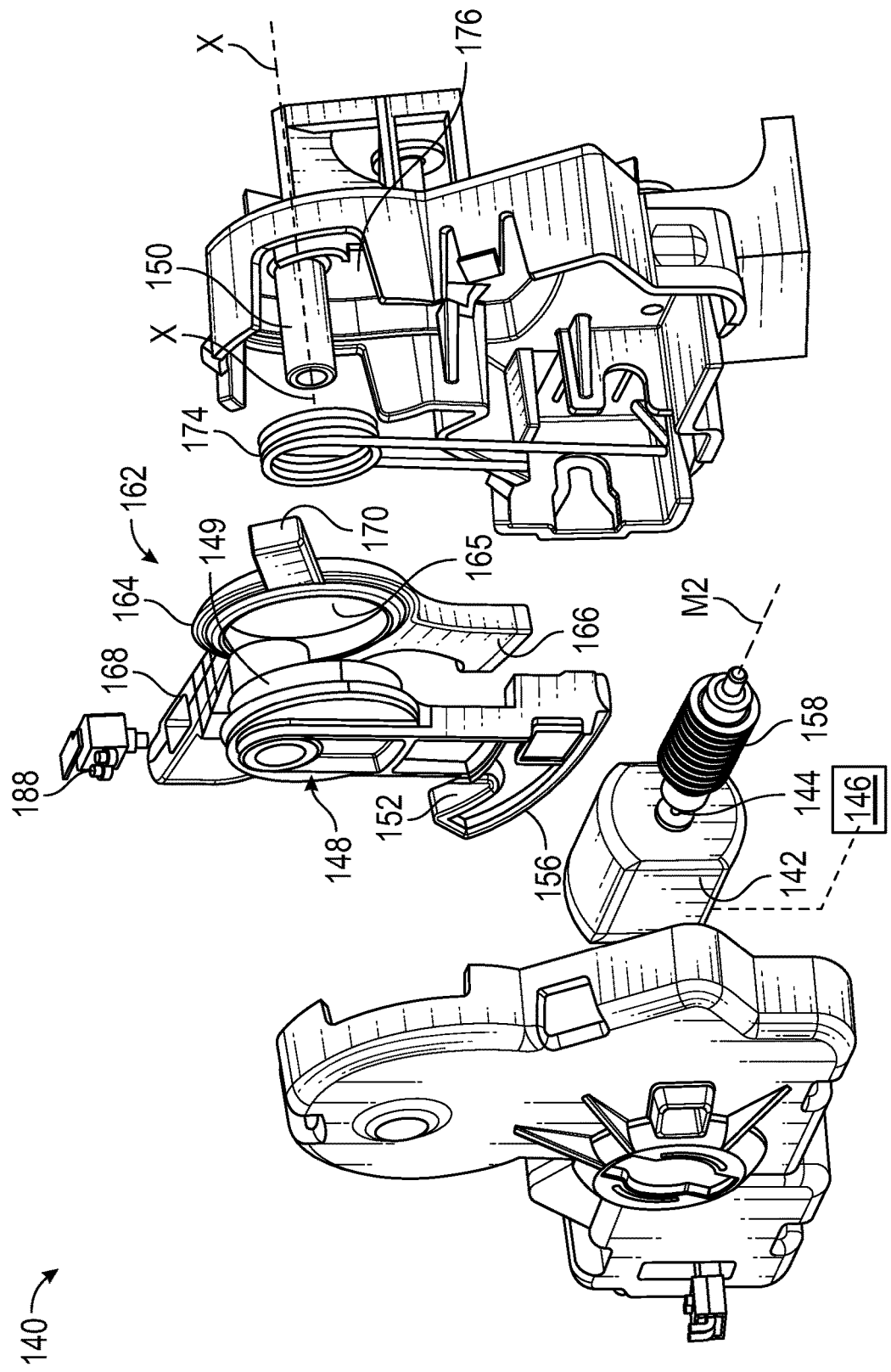
FIG. 14 is an exploded perspective view of another actuation system according to an embodiment.

The glove box actuation system 140 may be mounted within a housing or casing to protect the glove box actuation system 140 from dirt, dust, and debris. Although a casing of the glove box actuation system 140, separate from the housing 112 of the glove box assembly 110 is shown in FIG. 14, in other embodiments, all or a portion of the casing is defined by the housing 112.

In an embodiment, the glove box actuation system 140 is operable to automatically open the glove box door 114. As best shown in FIG. 14, the glove box actuation system 140 generally includes a prime mover 142, such as a motor having a motor shaft 144 rotatable about an axis M2 for example. In an embodiment, the prime mover 142 is operated in response to receipt of a signal, operation of a switch, or another equivalent means, illustrated at 146.

Referring now to FIGS. 14-17, an example of a glove box actuation system 140 is shown in more detail. In the illustrated non-limiting embodiment of FIGS., in addition to the prime mover 142 and motor shaft 144, the glove box actuation system 140 includes an opening lever 148 rotatably mounted to the side 118 of the housing 112 via a pin 150. In the illustrated, non-limiting embodiment, the opening lever 148 is positioned directly adjacent the prime mover 142 and includes a gear section 152. The gear section 152 of the opening lever 148 includes a plurality of gear teeth 156 (best shown in FIGS. 16 and 17) and is rotatable driven about an axis X defined by the pin 150 by a worm 158 mounted to the motor shaft 144. Although not shown, one or more end stops for limiting rotation of the opening lever 148 may be mounted to a side 118 of the housing 112.

Figure 15:
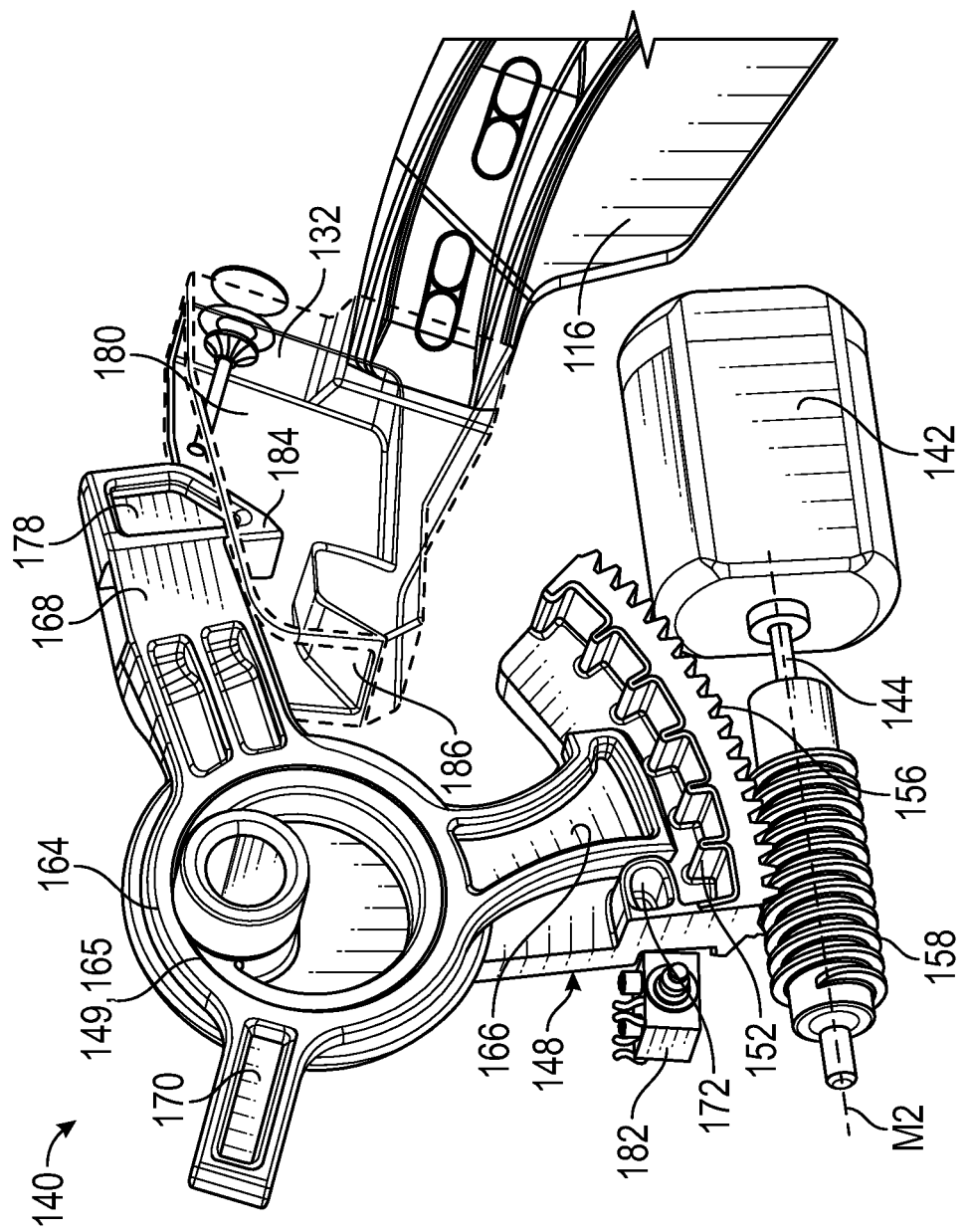
FIG. 15 is a perspective view of a portion of the actuation system of FIG. 14 when the glove box door is an open position according to an embodiment.
Figure 16:
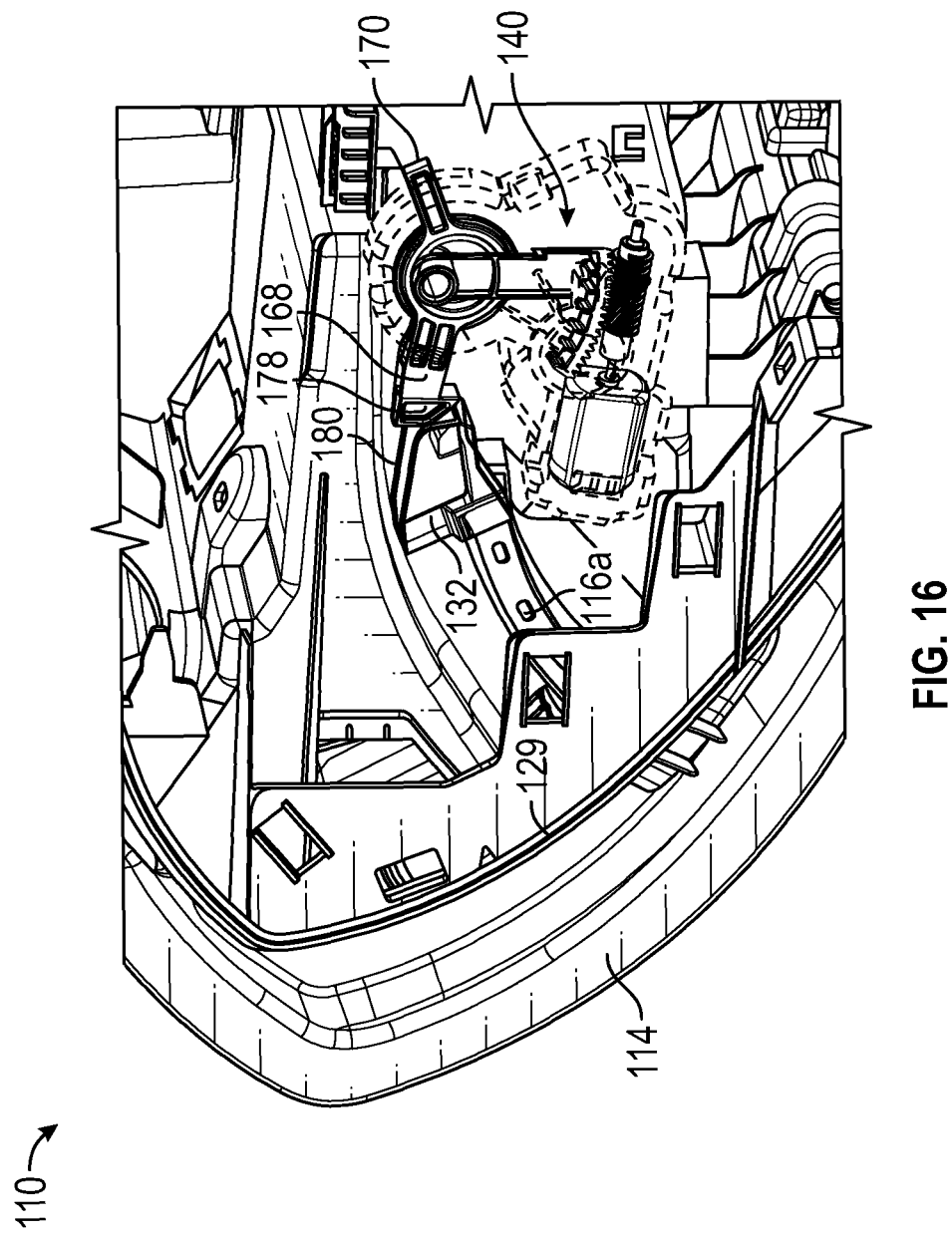
FIG. 16 is a side perspective view of a glove box assembly in a pre-closed position according to an embodiment.
Figure 17:
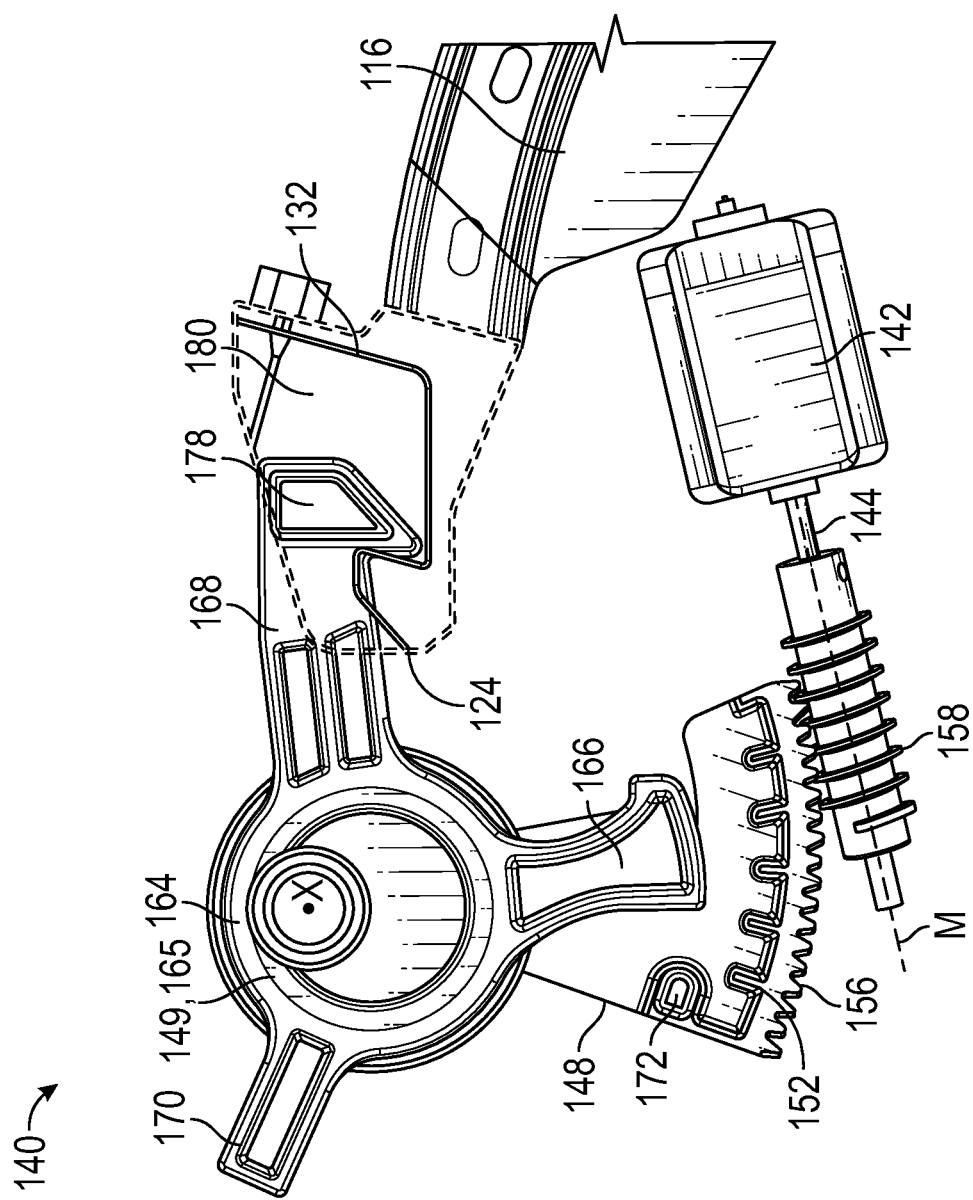
FIG. 17 is a front view of a portion of the actuation system of FIG. 14 when the glove box door is a pre-closed position according to an embodiment.

The glove box actuation system 140 additionally includes a locking lever 162 movably mounted to the side 118 of the housing 112. In the illustrated, non-limiting embodiment, the locking lever 162 includes a body 164 having a central opening 165. The central opening 165 of the locking lever 162 is sized to receive an upper portion 149 of the opening lever 148 within the opening. Accordingly, as best shown in FIGS. 15 and 17, the locking lever 162 is mounted generally concentrically with a portion of the opening lever 148. Through this engagement, the locking lever 162 is movable not only in unison with the opening lever 148, for example about axis X of the pin 150, but also to relative to the opening lever, such as about an axis offset from the axis of the pin 150. This offset between the axis of the pin 150 and the axis of the locking lever 162 results in an eccentric movement when the locking lever 162 rotates relative to the opening lever 148, to be described in more detail below.

The body 164 of the locking lever 162 additionally includes one or more arms. As shown, the body 164 includes a first arm 166, second arm 168, and third arm 170 spaced about the periphery of the body 164. However, embodiments having fewer than three arms are also within the scope of the disclosure. In the illustrated, non-limiting embodiment, the first arm 166 is configured to cooperate with a protrusion 172 of the opening lever 148 and the second arm 168 is configured to cooperate with an adjacent arm 116 of the glove box door 114. A biasing mechanism 174, such as a torsion spring for example (see FIG. 14), may be mounted about the pin 150 and coupled to the body 164 of the locking lever 162. In an embodiment, the biasing mechanism 174 may be operable to bias the locking lever 162, and more specifically the second arm 168 of the locking lever 162, into engagement with an adjacent arm 116 of the glove box door 114. In an embodiment, a cutout or opening 176 is formed in a portion of the housing 112 adjacent the third arm 170 of the locking lever 162. The end surfaces of the cutout 176 define a limit for the rotation of the locking lever 162 about the axis X of the pin 150, in a first direction driven by the biasing mechanism 174, and/or in a second direction driven by the prime mover 142.

Figure 18:
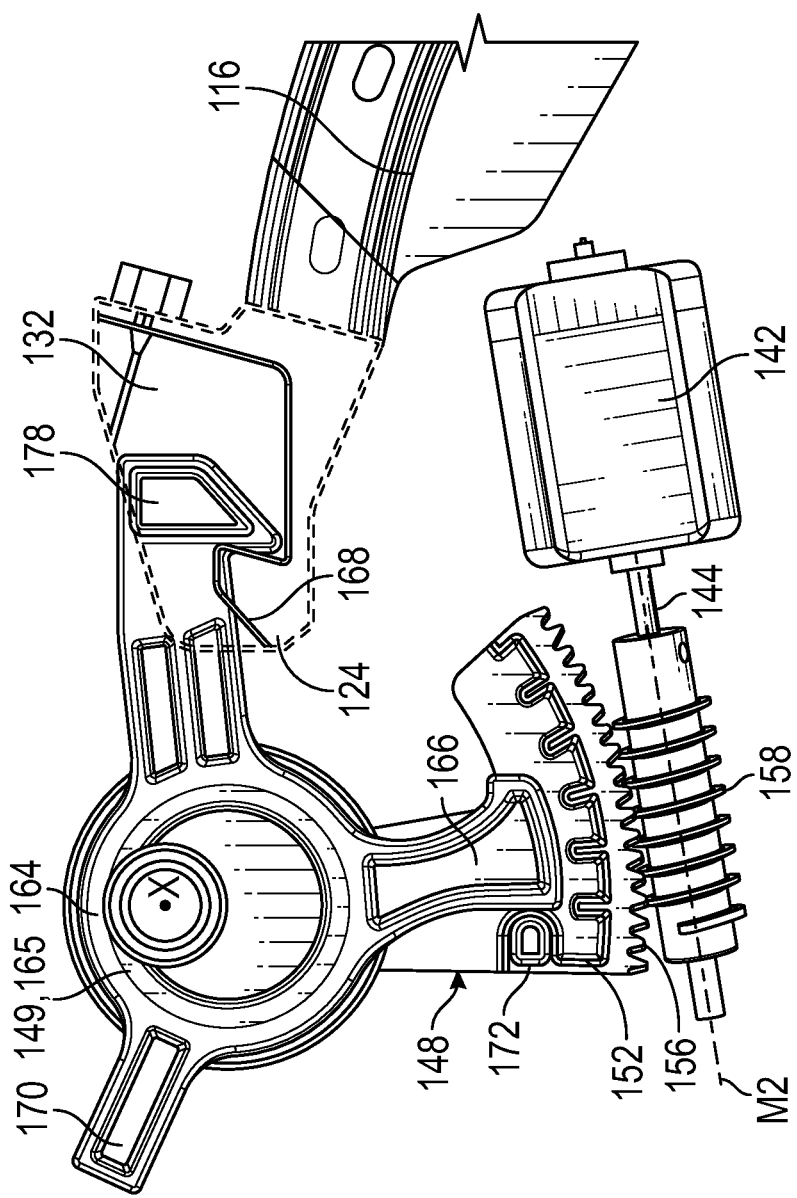
FIG. 18 is a front view of a portion of the actuation system of FIG. 14 when the glove box door is a closed position according to an embodiment.
Figure 19:
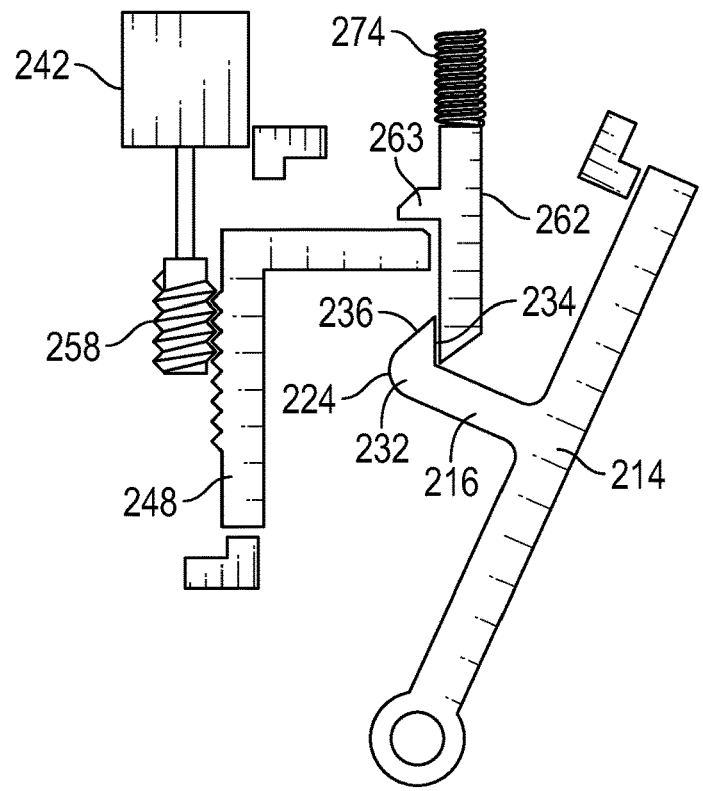
FIG. 19 is a schematic diagram of another actuation system according to an embodiment.
Figure 20:
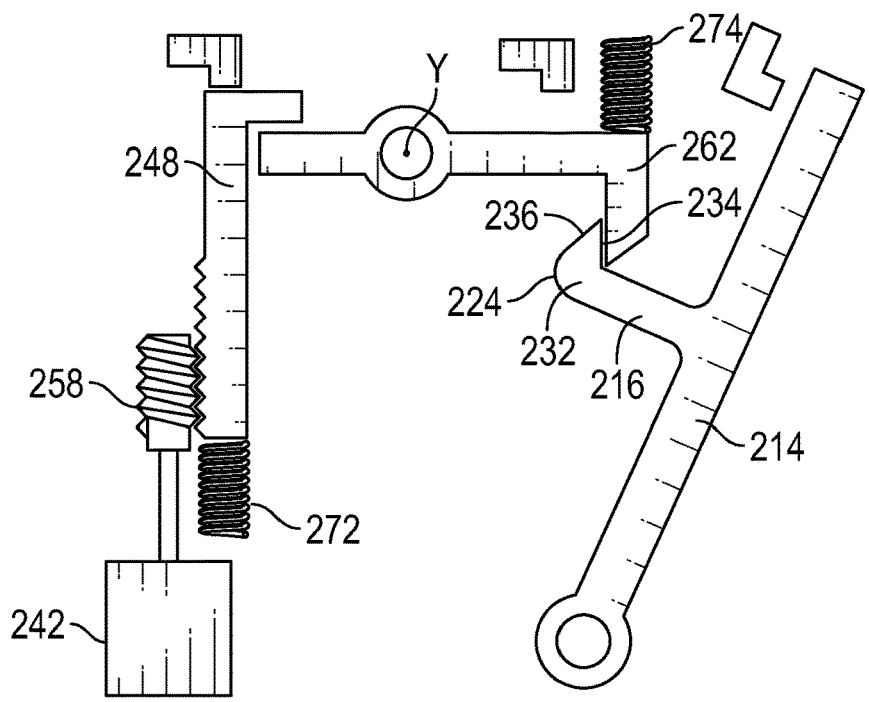
FIG. 20 is a schematic diagram of another actuation system according to an embodiment.

As best shown in FIGS. 17 and 18, an engagement member 178 may be formed at the distal end of the second arm 168 of the locking lever 162. The engagement member 178 is configured to cooperate with a portion of the adjacent arm 116, such as a first engagement surface, to retain the glove box door 114 in the closed position relative to the housing 112. In an embodiment, the connector 132 mounted at the second end 124 of the arm 116 includes an opening or cavity 180 within which at least a portion of the engagement member 178 of the locking lever 162 may be received. When the engagement member 178 is positioned within the cavity 180, contact between the engagement member 178 and the first engagement surface 181 of the connector 132 opposes the gravitational force acting on the glove box door 114, thereby preventing the glove box door 114 from opening.

To open the glove box door 114, a signal is provided to the prime mover 142 from a switch 146 or another equivalent means. In an embodiment, the switch 146 may be located remotely from the glove box assembly 110, such as on or adjacent a dashboard or console of a vehicle for example. In response to the signal, the prime mover 142 rotates the motor shaft 144 and the worm 158 coupled thereto in a first direction about axis M2. As the motor shaft 144 rotates, the gear section 152 of the opening lever 148 is driven about the axis X of the pin 150. As the opening lever 148 rotates about the axis X, the protrusion 172 of the opening lever 148 generally adjacent the gear section 152 engages the first arm 166 of the locking lever 162. This engagement between the protrusion 172 and the first arm 166 transmits the rotational force of the opening lever 148 to the locking lever 162, causing both the opening lever 148 and the locking lever 162 rotate in unison about axis X. The movement of the locking lever 162 about axis X of the pin 150 opposes the biasing force of the biasing mechanism 174. Through this movement, the engagement member 178 extending from the second arm 168 of the locking lever 162 is pivoted out of contact with the arm 116a.

Once separated, the arm 116a is able to move relative to the housing 112 along a path defined by the arm 116a and the opening. In an embodiment, the glove box door 114 is able to transform to the open position via gravity once the engagement member 178 is separated therefrom. The arm 116a will move relative to the housing 112 until the connector 132 contacts a surface of the front panel 129. In an embodiment, as the second arm 168 of the locking lever 162 separates from the arm 116a of the glove box door 114, the second arm 168 engages an adjacent switch 188. The switch 188 generates a signal causing the prime mover 142 to operate in a second direction to drive the opening lever 148 back towards its original position. In an embodiment, the prime mover 142 will rotate the opening lever 148 in the second direction about axis X until the opening lever 148 contacts an adjacent switch 182 to indicate that the opening lever 148 is at a home position.

As the prime mover 142 drives the opening lever 148 in the second direction towards a home position, the force applied to the locking lever 162 by the protrusion 172 is removed. Accordingly, the biasing force of the biasing mechanism 174 will cause the locking lever 162 to rotate about the opening lever 148 back to a first position.

In the event of a failure of the prime mover 142, such as due to damage for example, a user may be able to manually open the glove box door 114. In an embodiment, the locking lever 162 of the glove box actuation system 140, may be mounted to the housing 112 such that the third arm 170 of the locking lever 162 is exposed adjacent an underside of the housing 112 when the glove box assembly 10 is mounted within a vehicle. Accordingly, an operator is able to manually rotate the locking lever 162 relative to the opening lever 148 in a direction opposing the biasing force of the biasing mechanism 174, such as via application of a force to the third arm 170 for example, to release the locking lever 162 from the arm 116a, thereby opening the glove box door 114.

To close the glove box door 114 and seal the compartment of the housing 112, the glove box door 114 is moved manually, via application of a force by a user to a pre-closed position, shown in FIG. 15. As the glove box door 114 approaches the front panel 129 of the housing 112, a portion of the arm 116a, for example the connector 132, contacts a first surface 184 of the engagement member 178 of the locking lever 162. In the illustrated, non-limiting embodiment, the portion of the connector 132 that contacts the engagement member 178 includes a sloped or ramp-like second engagement surface 186 extending generally from the cavity 180 to the second end 124. As the glove box door 114 moves towards the pre-closed position, the second engagement surface 186 of the arm 116a engages the corresponding sloped first surface 184 of the engagement member 178. As the glove box door 114 moves, the contour of surfaces 186 and 184 causes the second arm 168 of the locking lever 162 to rotate relative to the opening lever 148 in a direction opposing the bias of the biasing mechanism 174 until the surface of the engagement member 178 reaches the cavity 180. In the pre-closed position, the second arm 168 of the locking lever 162 is configured to engage an adjacent microswitch 188, best shown in FIG. 14.

In response to actuation of the microswitch 188, a signal is provided to the prime mover 142 to drive the opening lever 148 about the pin axis X. In an embodiment, the rotation of the opening lever 148 in response to microswitch 188 is in the direction indicated by arrow C. Because the body 164 of the locking lever 162 is mounted eccentrically about portion 149 of the opening lever 148, as the prime mover 142 drives rotation of the opening lever 148 towards the arm 116a, the locking lever 162 moves, for example in a direction perpendicular to the pin axis X. The movement causes the engagement member 178 of the second arm 168 of the locking lever 162 to apply an additional force to the first engagement surface of the connector 132 to pull the glove box door 114 from the pre-closed position to a fully closed position. The biasing force of the biasing mechanism 174 maintains this connection between the second arm 168 of the locking lever 162 and the arm 116a of the glove box door 114 to retain the glove box door 14 in the closed position.

Various other configurations of a glove box actuation system 240 suitable for use in any glove box assembly, such as assemblies 10, 110, are illustrated and described herein are shown in FIGS. 19-25. Each of the embodiments illustrated in FIGS. 19-21, includes an opening lever 248 movable via an actuator or prime mover 242 and a pin 262 operably coupled to both the opening lever 248 to an arm 216 of a glove box door 214. In the actuation systems of FIGS. 19 and 20, each opening lever 248 has a non-linear configuration, such as an L-shape for example, and is driven linearly along an axis via engagement with a worm 258 coupled to the prime mover 242. The translational movement of the opening lever 248 may cause a similar translation of the pin 262, in a direction opposing the biasing force of the biasing mechanism 274, to decouple the pin 262 from the arm 216 of the door 214 (FIG. 19), or alternatively, may cause a rotation of the pin 262 about an axis Y, in a direction opposing the biasing force of the biasing mechanism 274 (FIG. 20), to separate the pin 262 from arm 216 of the door 214.

Figure 21:
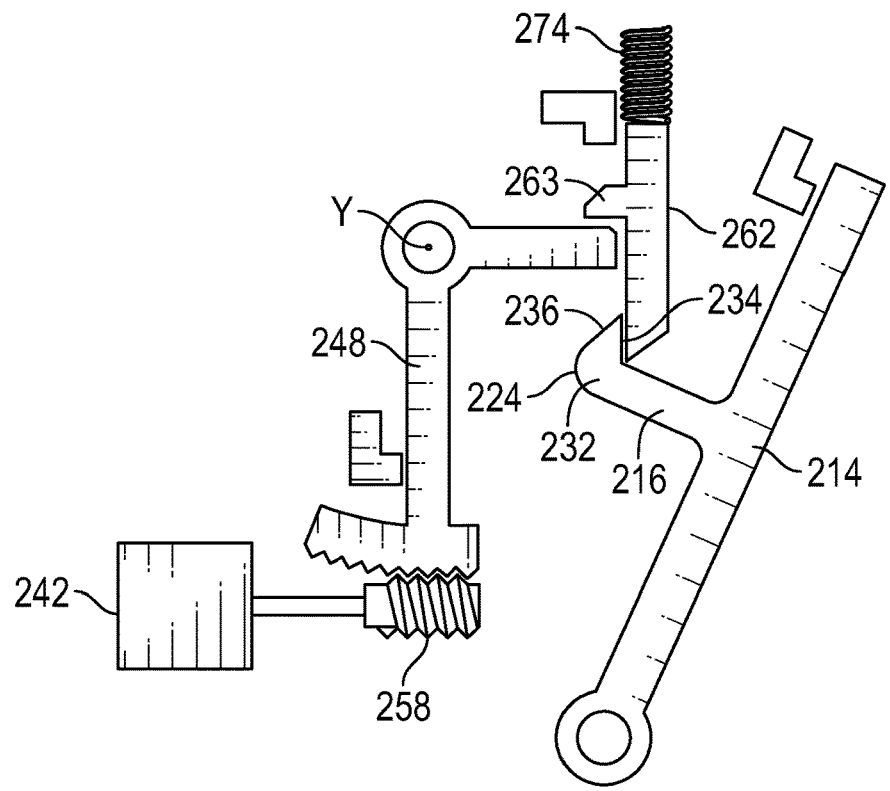
FIG. 21 is a schematic diagram of another actuation system according to an embodiment.

In another embodiment, illustrated in FIG. 21, the opening lever 248 is rotated about an axis Z in response to operation of the prime mover 242. As shown, the opening lever 248 may include a plurality of teeth engaged with the worm 258 of the prime mover 242. This rotation of the opening lever 248 may engage a tab 263 extending from the pin 262, thereby causing the pin 262 to translate linearly in a direction opposing the biasing force of the biasing mechanism 274. This translation of the pin 262 separates the pin 262 from the door 214. However, as previously described, embodiments where a rotation of the opening lever 248 results in a similar rotation of the pin 262 to separate the pin 262 from the door 214 are also within the scope of the disclosure.

Figure 22:
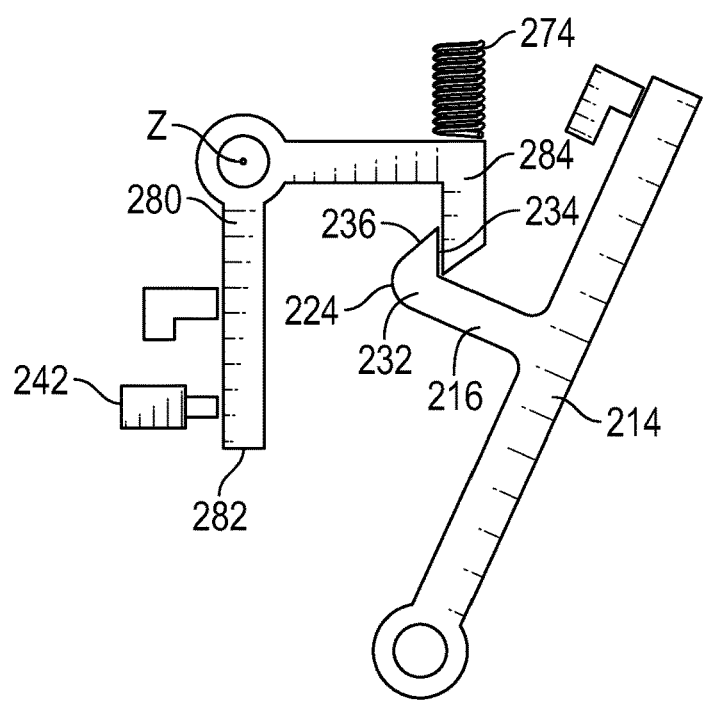
FIG. 22 is a schematic diagram of another actuation system according to an embodiment.
Figure 23:
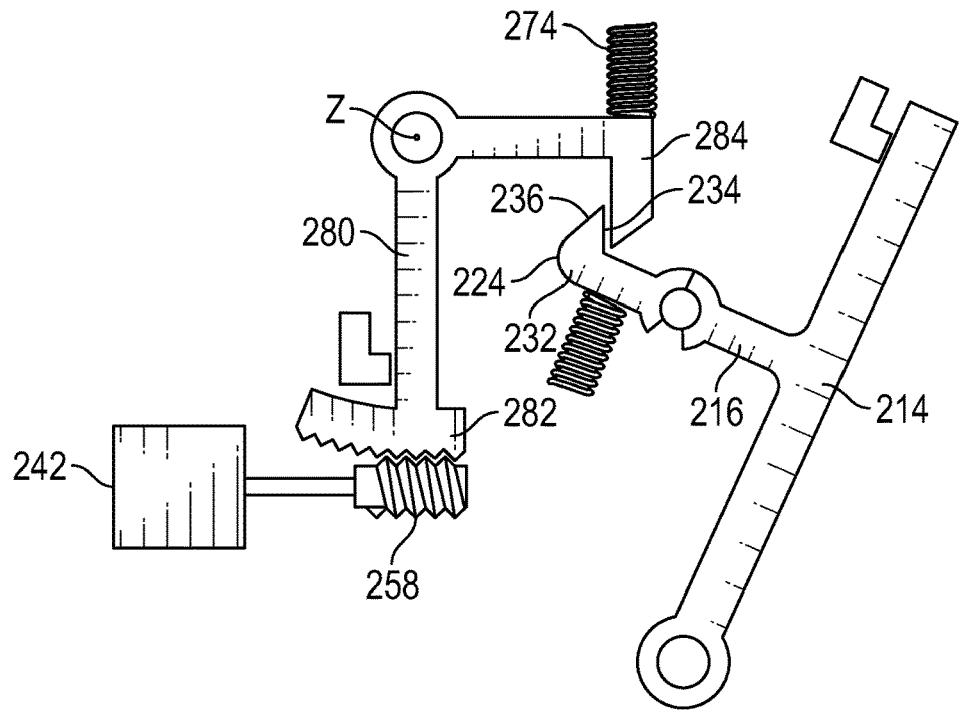
FIG. 23 is a schematic diagram of another actuation system according to an embodiment.

With reference now to FIGS. 22-25, the functionality of the opening lever 248 and the pin 262 may be integrated into a single component identified herein as lever 280. In the non-limiting embodiment of FIGS. 22 and 23, lever 280 has a non-linear configuration, such that a prime mover 242 cooperates with a first end 282 of the lever 280 and a second end 284 of the lever 280 engages the arm 216 of the glove box door 214. As shown, the lever 280 may be configured to rotate about an axis Z. In such embodiments, the lever 280 may be driven via engagement with a worm 258 (FIG. 23), or alternatively, the prime mover 242 may be a linear actuator operable to apply a force to the end 282 of the lever 280 (FIG. 22). Regardless of how the lever 280 is driven about the axis Z, the lever 280 is rotated in a direction opposing the biasing force of the biasing mechanism 274, to separate the second end 284 of the lever 280 from the arm 216 of the door 214.

Figure 24:
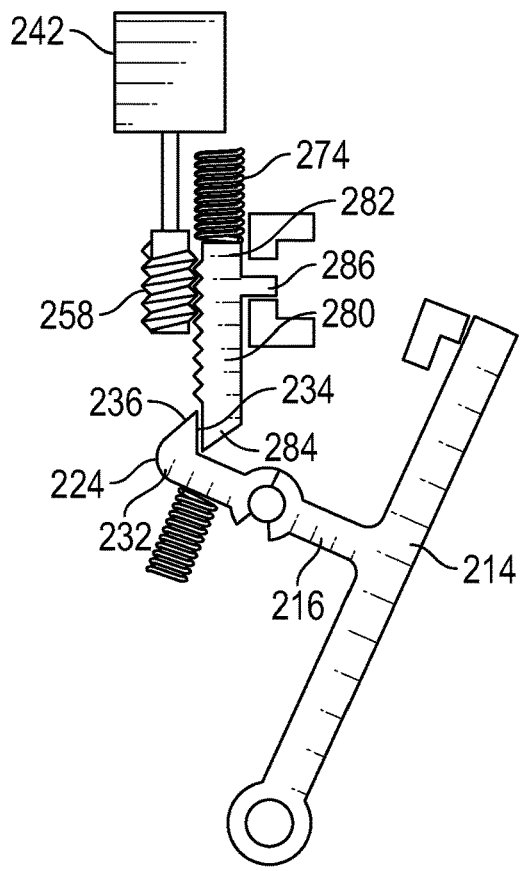
FIG. 24 is a schematic diagram of another actuation system according to an embodiment.
Figure 25:
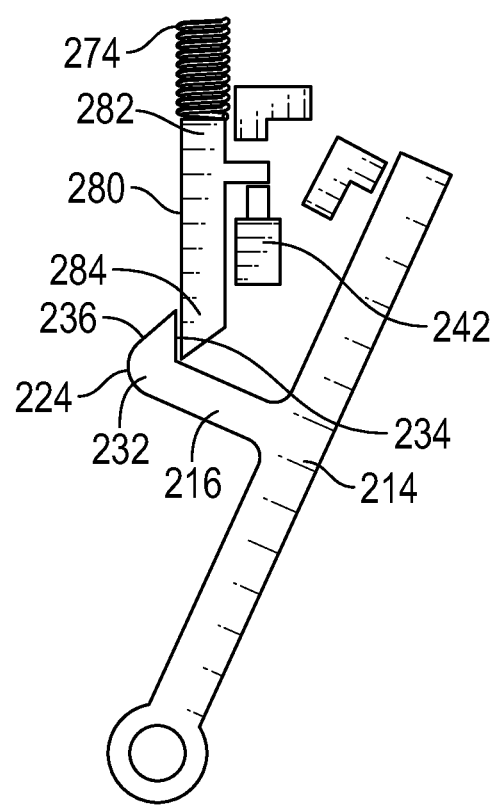
FIG. 25 is a schematic diagram of another actuation system according to an embodiment.

Alternatively, in another embodiment, best shown in FIGS. 24 and 25, the lever 280 may have a linear configuration, with a first end 282 associated with an adjacent biasing mechanism 274 and a second end 284 configured to engage the arm 216 of the glove box door 214. As previously described, a worm 258 coupled to the prime mover 242 is arranged in engagement with one or more teeth in the lever and is operable to translate the lever 280 linearly, against the bias of the biasing mechanism 274, and out of engagement with the arm 216 (FIG. 24). In another embodiment shown in FIG. 25, the prime mover 242 may be a linear actuator that applies a force to a tab or protrusion 286 extending from a portion of the lever 280 to translate the lever 280 linearly, against the bias of the biasing mechanism 274, and out of engagement with the arm 216 of the door 214.

In each of the embodiments of FIGS. 19-25, the end of the pin 262, or alternatively, the second end 284 of the lever 280 is configured to cooperate with a portion of the arm 216 to retain the door 214 in the closed position. As shown, the distal end 224 of the arm 216 includes a hook 232, and engagement between a first engagement surface 234 of the hook 232 and the pin 262 or second end 284 of the lever 280 restricts movement of the door 214 towards an open position. When movement of the pin 262 or lever 280 opposes the biasing force of the biasing mechanism 274, thereby moving the pin 262 or lever 280 out of engagement with the hook 232 of the arm 216, the door 214 will move freely to the open position due to gravity.

In an embodiment, the end of the pin 262 or lever 280 has a sloped configuration, and a second engagement surface 236 of the hook 232 has a complementary ramp-like contour. When the door 214 is rotated from the open position toward the closed position, the second engagement surface 236 of the hook 232 contacts the end of the pin 262 or lever 280. As the door 214 rotates, the sloped configuration of the abutting surfaces will move the pin 262 or lever 280 in a direction opposing the biasing force of the biasing mechanism 274. Once the door 214 reaches a position where the second engagement surface 236 of the hook 232 and the end of the pin 262 or lever 280 disengage, the biasing force of the biasing mechanism 274 will move the pin 262 or lever 280 to a position (i.e. into engagement with the first engagement surface 234 of the hook 232) to prevent rotation of the door 214 due to gravity.

Figure 4:
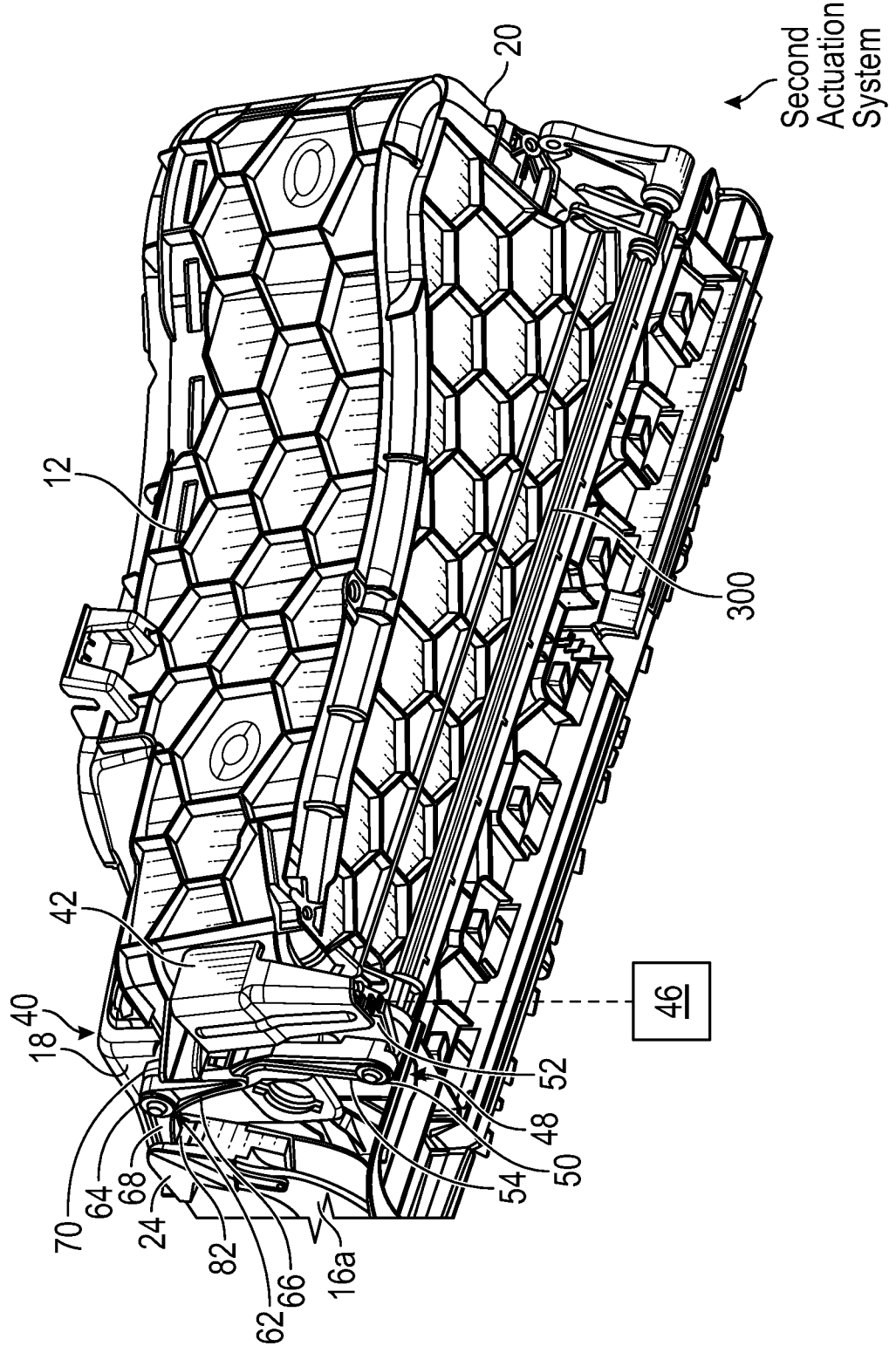
FIG. 4 is a rear perspective view of a glove box assembly in an open position according to an embodiment.
Figure 5:
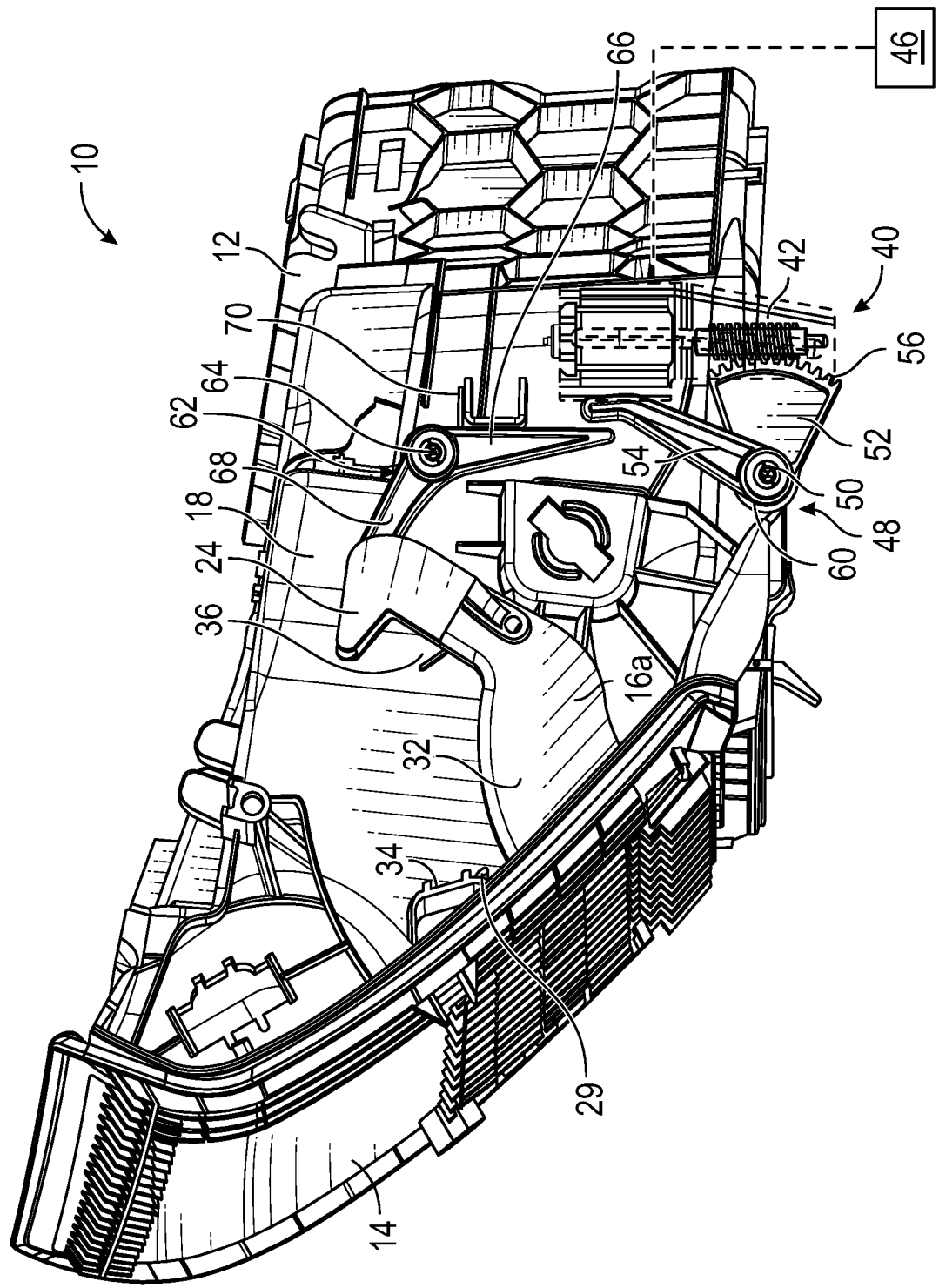
FIG. 5 is a side view of an actuation system of a glove box assembly in a closed position according to an embodiment.
Figure 6:
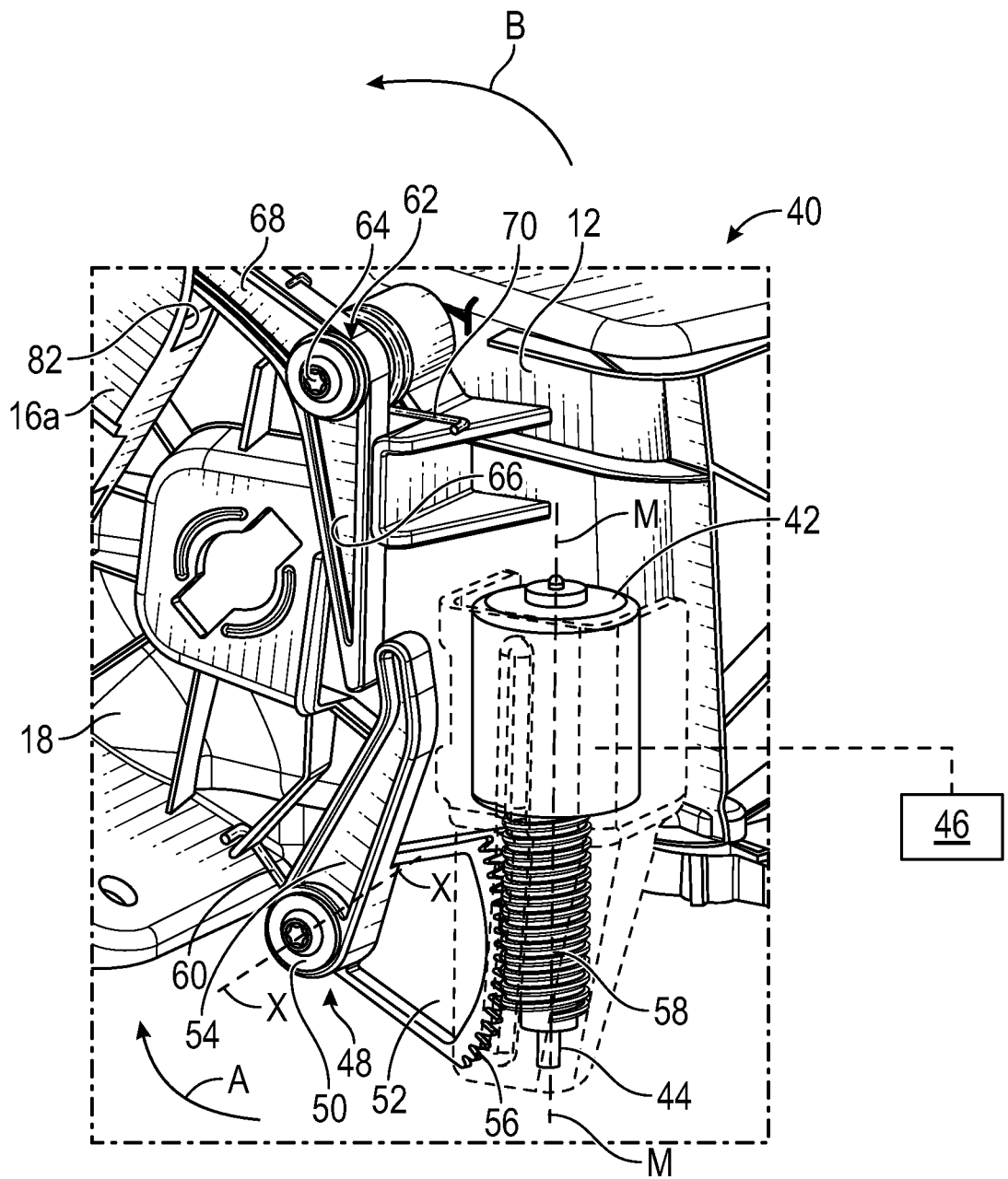
FIG. 6 is a detailed view of a portion of the actuation system of FIG. 5 according to an embodiment.
Figure 7:
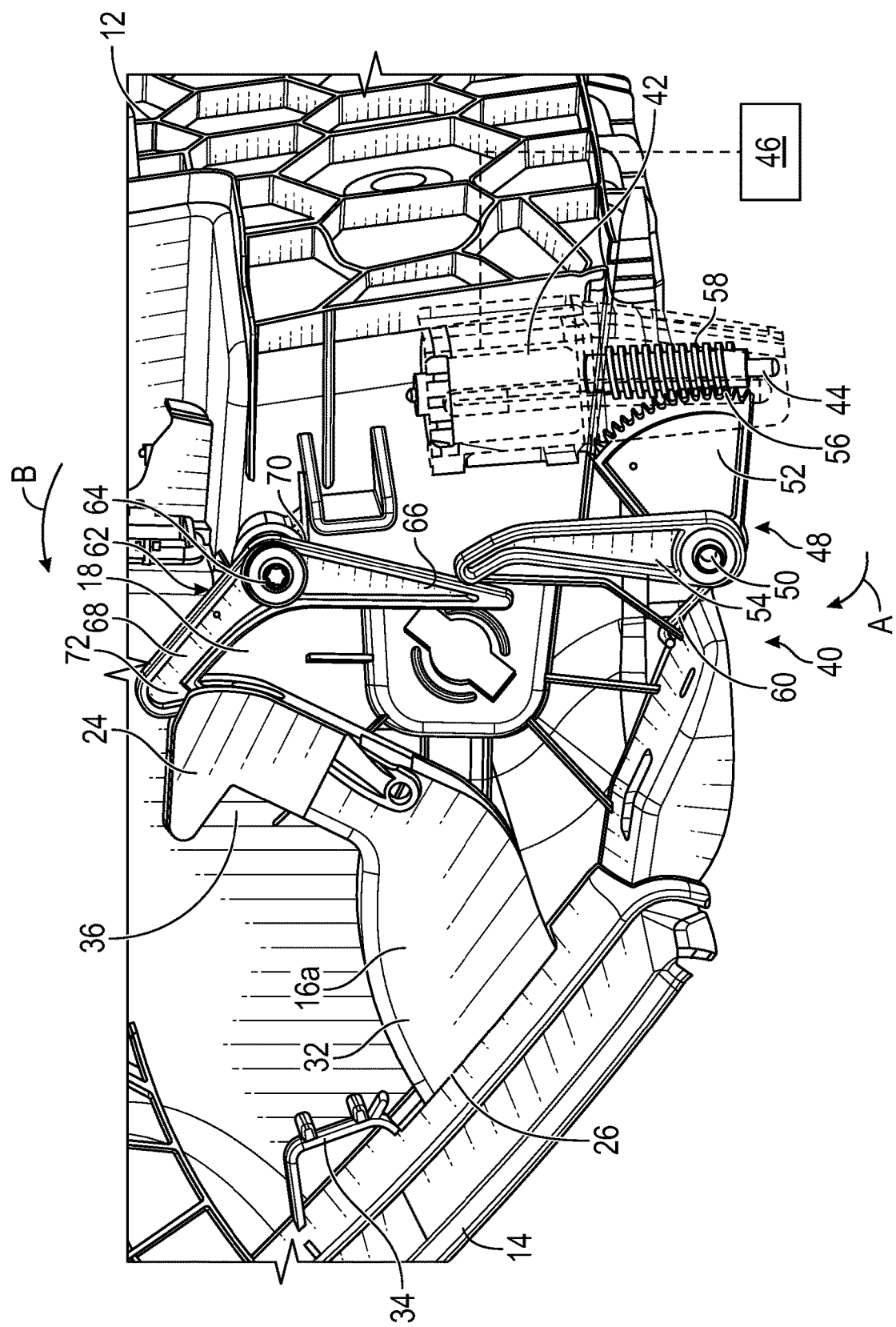
FIG. 7 is a side view of an actuation system of a glove box assembly transforming from an open position to a closed position according to an embodiment.
Figure 8:
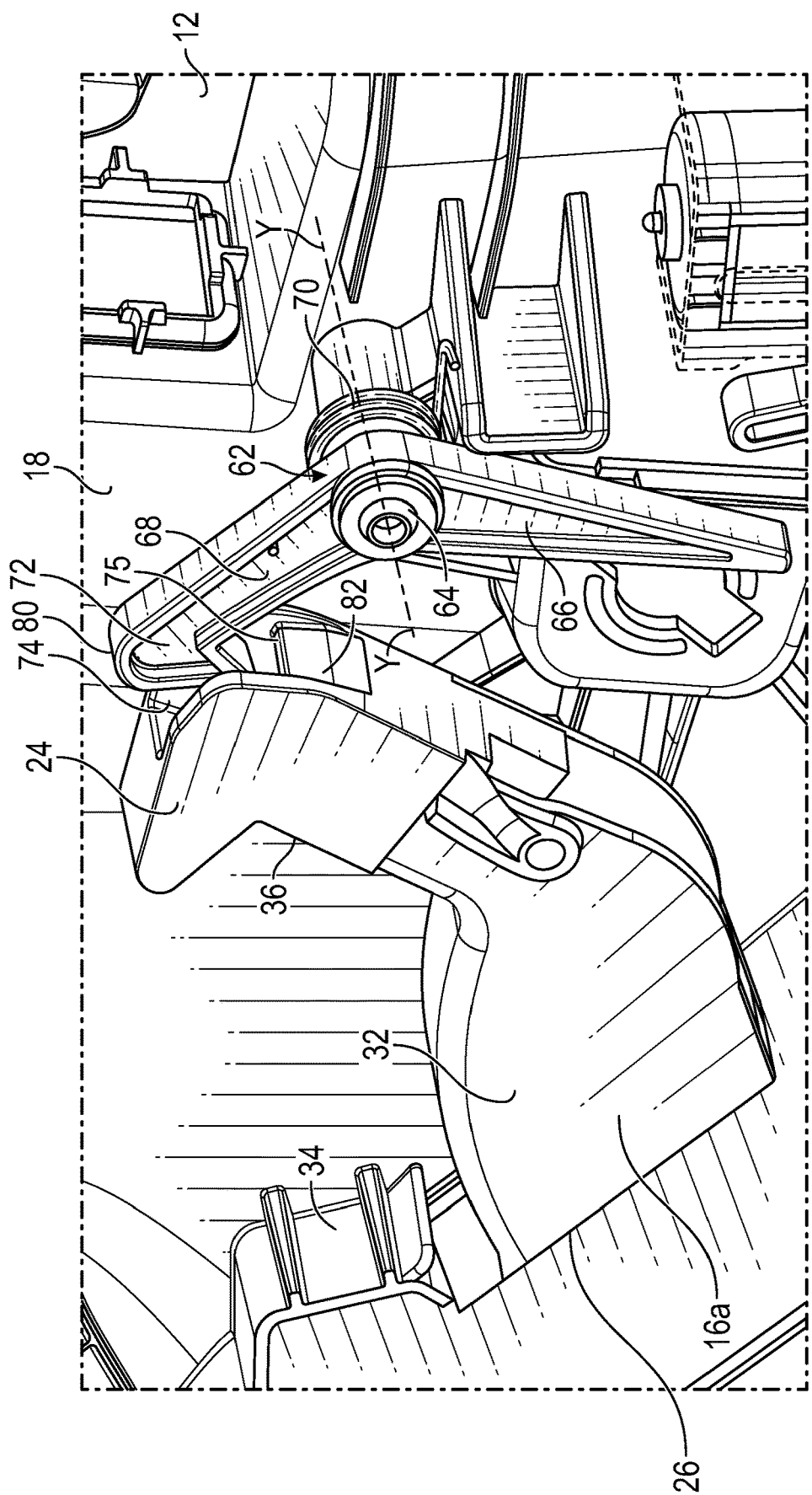
FIG. 8 is a detailed view of an actuation system of FIG. 7 according to an embodiment.
Figure 9:
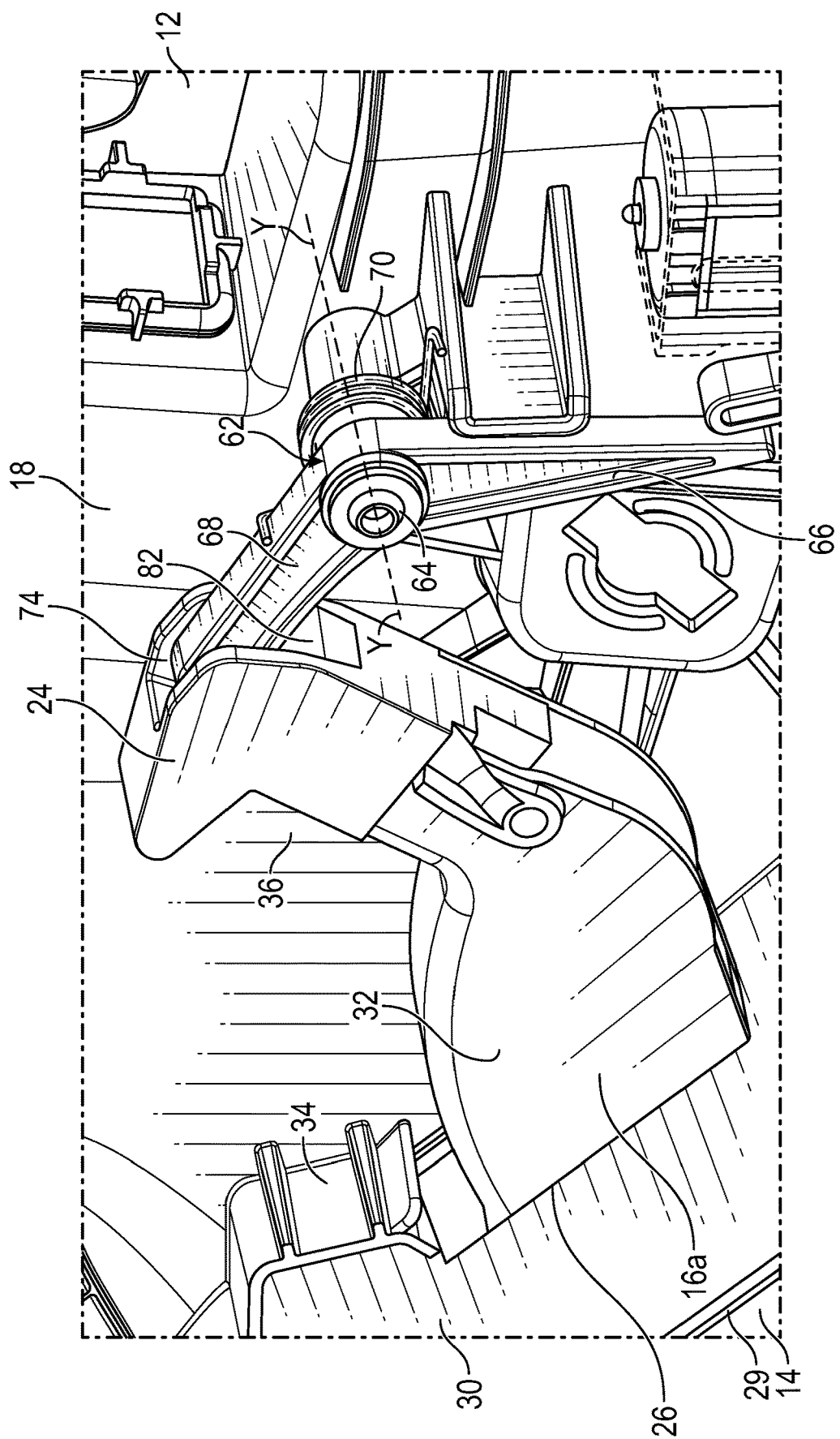
FIG. 9 is a detailed view of an actuation system of a glove box assembly in a closed position according to an embodiment.

Further, it should be understood that although each of the glove box actuation systems 40, 140, 240 is illustrated and described with respect to a single side of the housing and a corresponding arm 16a, 116a, 216, it should be understood that a glove box assembly may additionally two or more glove box actuation systems 40, 140, 240, such as arranged at opposite sides of the housing for example. In embodiments where a first actuation system is arranged adjacent a first side of the housing and a second actuation system is arranged adjacent a second, opposite side of the housing, the first glove box actuation system and the second glove box actuation system may, but need not be substantially identical. In an embodiment, the first and second actuation systems disposed at opposite sides 118, 120 of the housing 112 may be operably coupled via one or more mechanical or electrical mechanisms, such as linkage 300 (FIG. 4). In such embodiments, the glove box assembly need only include a single prime mover 42, 142, 242 capable of operating both actuation systems. However, embodiments including two separately operable actuation systems are also contemplated herein.

Embodiment 1: A compartment assembly including a housing, a door movable relative to the housing between an open position and a closed position, an arm extending from the door, the arm having a first engagement surface and a second engagement surface; and an actuation system. The actuation system includes a prime mover, a pin connected to the housing and operably coupled to the door, the pin being movable by the prime mover, and a biasing mechanism coupled to the pin, wherein the pin is biased by a biasing force of the biasing mechanism into engagement with the arm. When the door is in the closed position, engagement between the first engagement surface and the pin restricts movement of the door, and engagement between the second engagement surface and the pin opposes the biasing force of the biasing mechanism to allow movement of the door.

Embodiment 2: The compartment assembly as in any prior embodiment, wherein at least one of said second engagement surface and an end of the pin has a sloped contour.

Embodiment 3: The compartment assembly as in any prior embodiment, wherein said second engagement surface is engaged with said pin during movement of the door from the open position to the closed position.

Embodiment 4: The compartment assembly as in any prior embodiment, wherein the prime mover is operable to move said pin linearly against the biasing force of the biasing mechanism.

Embodiment 5: The compartment assembly as in any prior embodiment, the prime mover is operable to rotate said pin against the biasing force of the biasing mechanism.

Embodiment 6: The compartment assembly as in any prior embodiment, further comprising an opening lever operably coupled to the pin to transfer movement from the prime mover to the pin.

Embodiment 7: The compartment assembly as in any prior embodiment, wherein the prime mover is operable to move said opening lever linearly.

Embodiment 8: The compartment assembly as in any prior embodiment, wherein the prime mover is operable to rotate said opening lever.

Embodiment 9: The compartment assembly as in any prior embodiment, wherein the actuation system is operable to move the door from the closed position to the open position in response to an input signal.

Embodiment 10: The compartment assembly as in any prior embodiment, further comprising a switch located remotely from the compartment assembly, the switch being operable to generate the input signal.

Embodiment 11: A compartment assembly including a housing, a door movable relative to the housing between an open position and a closed position, and an actuation system operably coupled to the door. The actuation system includes a prime mover; and a locking lever connected to the housing and rotatable by the prime mover, wherein when the door is in the closed position, the locking lever is coupled to a portion of the door to restrict movement of the door.

Embodiment 12: The compartment assembly as in any prior embodiment, further comprising an opening lever rotatable relative to the housing about a first axis, wherein the opening lever is operable to rotate the locking lever in response to operation of the prime mover.

Embodiment 13: The compartment assembly as in any prior embodiment, wherein the opening lever and the locking lever are rotatable about the first axis in unison.

Embodiment 14: The compartment assembly as in any prior embodiment, wherein the locking lever is eccentrically rotatable relative to the opening lever.

Embodiment 15: The compartment assembly as in any prior embodiment, wherein the locking lever is rotatable about a second axis offset from the first axis.

Embodiment 16: The compartment assembly as in any prior embodiment, wherein the actuation system is operable to automatically move the door from the closed position to the open position in response to an input signal.

Embodiment 17: The compartment assembly as in any prior embodiment, wherein the actuation system is manually operable to move the door from the closed position to the open position.

Embodiment 18: The compartment assembly as in any prior embodiment, wherein the door includes at least one arm including a first engagement surface and a second engagement surface, and engagement between the locking lever and the first engagement surface restricts movement of the door.

Embodiment 19: The compartment assembly as in any prior embodiment, wherein a biasing force of the biasing mechanism biases the engagement member of the locking lever into engagement with the at least one arm.

Embodiment 20: The compartment assembly as in any prior embodiment, wherein engagement between the second engagement surface and the locking lever as the door moves between from the open position to the closed position rotates the locking lever against the biasing force of the biasing mechanism.

Embodiment 21: The compartment assembly as in any prior embodiment, wherein the at least one arm is contoured such that the door rotates relative to the housing as it moves between the open position and the closed position.

Embodiment 22: The compartment assembly as in any prior embodiment, wherein the prime mover is self-locking.

Embodiment 23: The compartment assembly as in any prior embodiment, wherein the compartment assembly is a glove box assembly in a vehicle.

Embodiment 24: A method of opening a compartment door includes generating a signal to transform the compartment door of a compartment assembly between an open position and a closed position, operating a prime mover in response to the signal, and moving a pin out of engagement with the compartment door via operation of the prime mover, wherein moving the locking lever out of engagement with the compartment door includes opposing a biasing force of a biasing mechanism coupled to the pin.

Embodiment 25: The method as in any prior embodiment, wherein operating the prime mover and moving the pin occur automatically in response to signal.

Embodiment 26: The method as in any prior embodiment, wherein moving the pin out of engagement with the compartment door further comprises rotating an opening lever operably coupled to the pin, wherein the pin and the opening lever are rotatable about a single axis.

Embodiment 27: The method as in any prior embodiment, wherein moving the pin out of engagement with the compartment door further comprises rotating an opening lever operably coupled to the pin.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A compartment assembly comprising:
a housing;
a door movable relative to the housing between an open position and a closed position;
an arm extending from the door, the arm having a first engagement surface and a second engagement surface; and
an actuation system including:
a prime mover;
a pin connected to the housing and operably coupled to the door, the pin being movable by the prime mover;
a biasing mechanism coupled to the pin, wherein the pin is biased by a biasing force of the biasing mechanism into engagement with the arm; and
wherein when the door is in the closed position, engagement between the first engagement surface and the pin restricts movement of the door, and engagement between the second engagement surface and the pin opposes the biasing force of the biasing mechanism to allow movement of the door.

2. The compartment assembly of claim 1, wherein at least one of said second engagement surface and an end of the pin has a sloped contour.

3. The compartment assembly of claim 1, wherein said second engagement surface is engaged with said pin during movement of the door from the open position to the closed position.

4. The compartment assembly of claim 1, wherein the prime mover is operable to move said pin linearly against the biasing force of the biasing mechanism.

5. The compartment assembly of claim 1, wherein the prime mover is operable to rotate said pin against the biasing force of the biasing mechanism.

6. The compartment assembly of claim 1, further comprising an opening lever operably coupled to the pin to transfer movement from the prime mover to the pin.

7. The compartment assembly of claim 1, wherein the actuation system is operable to move the door from the closed position to the open position in response to an input signal.

8. A compartment assembly comprising:
a housing;
a door movable relative to the housing between an open position and a closed position; and
an actuation system operably coupled to the door, the actuation system including:
a prime mover; and
a locking lever connected to the housing and rotatable by the prime mover, wherein when the door is in the closed position, the locking lever is coupled to a portion of the door to restrict movement of the door.

9. The compartment assembly of claim 8, further comprising an opening lever rotatable relative to the housing about a first axis, wherein the opening lever is operable to rotate the locking lever in response to operation of the prime mover.

10. The compartment assembly of claim 9, wherein the opening lever and the locking lever are rotatable about the first axis in unison.

11. The compartment assembly of claim 9, wherein the locking lever is eccentrically rotatable relative to the opening lever.

12. The compartment assembly of claim 9, wherein the locking lever is rotatable about a second axis offset from the first axis.

13. The compartment assembly of claim 8, wherein the actuation system is operable to automatically move the door from the closed position to the open position in response to an input signal.

14. The compartment assembly of claim 8, wherein the actuation system is manually operable to move the door from the closed position to the open position.

15. The compartment assembly of claim 8, wherein the door includes at least one arm including a first engagement surface and a second engagement surface, and engagement between the locking lever and the first engagement surface restricts movement of the door.

16. The compartment assembly of claim 8, wherein the compartment assembly is a glove box assembly in a vehicle.

17. A method of opening a compartment door, comprising:

generating a signal to transform the compartment door of a compartment assembly between an open position and a closed position;

operating a prime mover in response to the signal; and moving a pin out of engagement with the compartment door via operation of the prime mover, wherein moving the locking lever out of engagement with the compartment door includes opposing a biasing force of a biasing mechanism coupled to the pin.

18. The method of claim 17, wherein operating the prime mover and moving the pin occur automatically in response to signal.

19. The method of claim 17, wherein moving the pin out of engagement with the compartment door further comprises rotating an opening lever operably coupled to the pin, wherein the pin and the opening lever are rotatable about a single axis.

20. The method of claim 17, wherein moving the pin out of engagement with the compartment door further comprises rotating an opening lever operably coupled to the pin.

* * * * *